(12) United States Patent
Mu

(10) Patent No.: US 11,924,869 B2
(45) Date of Patent: Mar. 5, 2024

(54) METHOD AND DEVICE FOR CONFIGURATION AND ADJUSTING SEARCH SPACE PARAMETER

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 507 days.

(21) Appl. No.: 17/228,559

(22) Filed: Apr. 12, 2021

(65) Prior Publication Data

US 2021/0235469 A1    Jul. 29, 2021

Related U.S. Application Data

(63) Continuation of application No. PCT/CN2018/109901, filed on Oct. 11, 2018.

(51) Int. Cl.
*H04W 72/12* (2023.01)
*H04W 48/12* (2009.01)
(Continued)

(52) U.S. Cl.
CPC ......... *H04W 72/542* (2023.01); *H04W 48/12* (2013.01); *H04W 72/23* (2023.01); *H04W 88/18* (2013.01); *H04L 2101/622* (2022.05)

(58) Field of Classification Search
CPC ... H04W 72/542; H04W 72/23; H04W 48/12; H04W 88/18; H04W 52/0216;
(Continued)

(56) References Cited

U.S. PATENT DOCUMENTS

| 2011/0205978 | A1 | 8/2011 | Nory et al. |
| 2013/0242750 | A1 | 9/2013 | Baker et al. |
| 2018/0302926 | A1* | 10/2018 | Bhorkar ............... H04L 5/005 |

FOREIGN PATENT DOCUMENTS

| CN | 102378211 A | 3/2012 |
| CN | 103312484 A | 9/2013 |

(Continued)

OTHER PUBLICATIONS

International Search Report issued in PCT/CN2018/109901, dated Jul. 16, 2019 with English translation, (4p).

(Continued)

*Primary Examiner* — Jamal Javaid
(74) *Attorney, Agent, or Firm* — Arch & Lake LLP

(57) ABSTRACT

A method and a device are provided for configuring and adjusting a search space parameter. The method includes: determining whether a current state meets a preset condition; obtaining a search space configuration parameter corresponding to the current state from pre-stored multiple sets of search space configuration parameters in response to determining that the current state satisfies the preset condition; switching a search space configuration parameter of a current search space for currently monitoring search space to the search space configuration parameter corresponding to the current state; and using the search space configuration parameter corresponding to the current state to continue monitoring the search space to obtain downlink control information (DCI) sent by a base station through a physical downlink control channel (PDCCH).

20 Claims, 18 Drawing Sheets

(51) Int. Cl.
   *H04W 72/23*      (2023.01)
   *H04W 72/542*     (2023.01)
   *H04W 88/18*      (2009.01)
   *H04L 101/622*    (2022.01)

(58) Field of Classification Search
   CPC ............. H04W 52/0229; H04L 5/0048; H04L 5/0053; H04L 5/0094
   See application file for complete search history.

(56) References Cited

FOREIGN PATENT DOCUMENTS

| CN | 103945541 A | 7/2014 |
|----|-------------|--------|
| CN | 108282290 A | 7/2018 |

OTHER PUBLICATIONS

First Office Action to Chinese Patent Application No. 201880001970.X dated Mar. 10, 2021 with English translation, (9p).

Motorola Mobility, Lenovo, "PUCCH Resource Allocation" Discussion and Decision, 3GPP TSG RAN WG1 #91, R1-1720926, Reno, Nevada, Nov. 27-Dec. 1, 2017, (10p).

Extended European Search Report of EP Application No. 18936702.2 dated Apr. 19, 2022, (11p).

NTT DOCOMO Inc. "Search Space", 3GPP TSG RAN WG1 Meeting #92, R1-1802480, Athens, Greece, Mar. 2, 2018, (17p).

Qualcomm Incorporated, "UE Power Saving for PDCCH Monitoring", 3GPP TSG-RAN WG1 NR AdHoc, R1-1700817, Jan. 16-20, 2017, Spokane, WA, (3p).

\* cited by examiner

METHOD AND DEVICE FOR CONFIGURATION AND ADJUSTING SEARCH SPACE PARAMETER

CROSS REFERENCE

This application is a Continuation application of PCT International Application No. PCT/CN2018/109901, filed on Oct. 11, 2018, the entire contents of which is incorporated herein by reference for all purposes.

TECHNICAL FIELD

The present disclosure relates to the field of communication technologies, and more particularly, to a method and a device for configuring and adjusting a search space parameter.

BACKGROUND

With the development of communication technologies, mobile communication may support increasing service types, such as a multimedia service, a cloud service, and an interactive service. In order to support these service types, power consumption of a terminal is also increasing.

As can be seen from an analysis of the power consumption of the terminal, reception and processing of a PDCCH (Physical Downlink Control Channel) are operations with more power consumption in the terminal. In the related art, in order to reduce the power consumption of the terminal, a base station may adjust a search space configuration parameter when the terminal monitors the PDCCH according to a service of the terminal, so that when the service of the terminal is sparse, a long search period is used to search for the PDCCH; or when a load of the terminal is small, a small CCE (Control Channel Element) aggregation degree is configured, etc.

SUMMARY

Embodiments of the present disclosure provide a method and a device for configuring and adjusting a search space parameter. Technical solutions are as follows.

According to a first aspect of the embodiments of the present disclosure, there is provided a method for configuring and adjusting search space parameter, which is applied to a terminal. The method includes that the terminal determines whether a current state satisfies a preset condition. Additionally, the terminal obtains a search space configuration parameter corresponding to the current state from pre-stored multiple sets of search space configuration parameters in response to determining that the current state satisfies the preset condition. Further, each set of search space configuration parameter includes at least one of a search period, a number of time units for continuous search in each search period, a monitoring occasion in the time units, a control channel element (CCE) aggregation degree in each monitoring occasion, a potential transmission position of a PDCCH under each CCE aggregation degree, and a downlink control information format. Moreover, the terminal switches a search space configuration parameter for currently monitoring search space to the search space configuration parameter corresponding to the current state and uses the search space configuration parameter corresponding to the current state to continue monitoring the search space to obtain downlink control information (DCI) sent by a base station through the PDCCH.

According to a second aspect of the embodiments of the present disclosure, there is provided a method for configuring and adjusting a search space parameter, which is applied to a base station. The method includes that the base station obtains multiple sets of search space configuration parameters corresponding to a plurality of different states of a terminal, respectively. Each set of search space configuration parameter includes at least one of a search period, a number of time units for continuous search in each search period, a monitoring occasion in the time units, a CCE aggregation degree in each monitoring occasion, a potential transmission position of a PDCCH under each CCE aggregation degree, and a downlink control information format. Further, the method includes that the base station sends parameter configuration information to the terminal. The parameter configuration information includes the multiple sets of search space configuration parameters, so that the terminal selects a search space configuration parameter corresponding to a current state of the terminal from the multiple sets of search space configuration parameters for switching.

According to a third aspect of the embodiments of the present disclosure, there is provided a device for configuring and adjusting a search space parameter. The device includes a processor and a memory for storing executable instructions of the processor. The processor is configured to determine whether a current state satisfies a preset condition and obtain a search space configuration parameter corresponding to the current state from pre-stored multiple sets of search space configuration parameters in response to determining that the current state satisfies the preset condition. Each set of search space configuration parameter includes at least one of a search period, a number of time units for continuous search in each search period, a monitoring occasion in the time units, a CCE aggregation degree in each monitoring occasion, a potential transmission position of a PDCCH under each CCE aggregation degree, and a downlink control information format. The processor is further configured to switch a search space configuration parameter for currently monitoring search space to the search space configuration parameter corresponding to the current state and use the search space configuration parameter corresponding to the current state to continue monitoring the search space to obtain DCI sent by a base station through the PDCCH.

According to a fourth aspect of the embodiments of the present disclosure, a device for configuring and adjusting a search space parameter is provided. The device includes a processor and a memory for storing executable instructions of the processor. The processor is configured to obtain multiple sets of search space configuration parameters corresponding to a plurality of different states of a terminal, respectively. Each set of search space configuration parameters includes at least one of a search period, a number of time units for continuous search in each search period, a monitoring occasion in the time units, a CCE aggregation degree in each monitoring occasion, a potential transmission position of a PDCCH under each CCE aggregation degree, and a downlink control information format. The processor is further configured to send parameter configuration information to the terminal. The parameter configuration information includes the multiple sets of search space configuration parameters, so that the terminal selects a search space configuration parameter corresponding to a current state of the terminal from the multiple sets of search space configuration parameters for switching.

It should be noted that the above general description and the following detailed description are merely exemplary and explanatory and should not be construed as limiting of the disclosure.

BRIEF DESCRIPTION OF THE DRAWINGS

The accompanying drawings herein, which are incorporated in and constitute a part of this specification, illustrate embodiments consistent with the present disclosure and, together with the specification, serve to explain the principles of the present disclosure.

DETAILED DESCRIPTION

Exemplary embodiments will be described in detail herein, examples of which are illustrated in the accompanying drawings. The following description refers to the same or similar elements in the different figures unless otherwise indicated. The embodiments described in the following exemplary embodiments do not represent all embodiments consistent with the present disclosure. Instead, they are merely examples of devices and methods consistent with some aspects of the present disclosure as detailed in the appended claims.

Technical solutions provided by the embodiments of the present disclosure involve a terminal and a base station. The terminal and the base station are connected through a mobile communication network. The terminal may be a mobile phone, a tablet computer, a smart watch, or another device with a mobile communication function, which is not limited by the embodiments of the present disclosure. In the related art, the base station typically adopts a high layer signaling to configure a new search space configuration parameter for the terminal, and since the terminal has a long processing flow for the high layer signaling, it takes a long time from the base station sending the high layer signaling to the terminal responding to the high layer signaling to adjust the search space configuration parameter, and when the terminal finally adjusts the search space configuration parameter, a service state of the terminal has changed, which causes the terminal to miss an optimal occasion for adjustment, and thereby leading to an inability of the terminal to effectively reduce the power consumption of the terminal. In the technical solutions provided by the embodiments of the present disclosure, the base station may configure a plurality of sets of search space configuration parameter for the terminal during initialization, and when determining that a current state satisfies a preset condition, the terminal may obtain the search space configuration parameter needed for switching from the multiple sets of search space configuration parameter according to a real-time state, and perform the switching, avoiding time delay caused by adjustment of the search space configuration parameter through the high layer signaling sent by the base station, thereby realizing a solution in which the terminal adjusts the search space configuration parameter at an optimal occasion, and improving efficiency of the terminal to adjust the search space configuration parameter, and reducing the power consumption of the terminal.

The embodiments of the present disclosure provide a method for configuring and adjusting search space parameter. Execution subjects of the method include the terminal and the base station. According to different execution subjects of the method, the embodiments of the present disclosure are divided into two sets of embodiments as follows.

Base Station Side

Figure 1A:
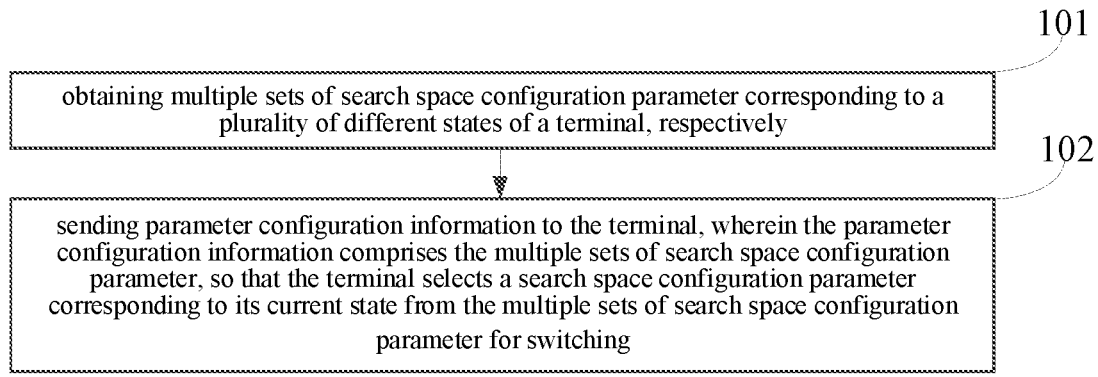
FIG. 1A is a flowchart showing a method for configuring and adjusting search space parameter according to an exemplary embodiment.

FIG. 1A is a flowchart showing a method for configuring and adjusting search space parameter according to an exemplary embodiment. The method for configuring and adjusting search space parameter is applied to a base station, and as shown in FIG. 1A, the method includes the following steps 101 to 102:

In the step 101, multiple sets of search space configuration parameter corresponding to a plurality of different states of a terminal are obtained, respectively.

Each set of search space configuration parameter includes at least one of a search period, a number of time units for continuous search in each search period, a monitoring occasion in the time unit, a CCE aggregation degree in each monitoring occasion, a potential transmission position of a PDCCH under each CCE aggregation degree, and a DCI format (Downlink Control Information format).

For example, after the terminal accesses the base station, the base station may first configure search space for the terminal, which is search space of the PDCCH, and then obtain the multiple sets of search space configuration parameter configured for the terminal. Optionally, the base station side may set N sets of search space configuration parameter for different service scenarios, where N is an integer greater than or equal to 2. For example, the N sets of search space configuration parameter set by the base station may include a search space configuration parameter suitable for scheduling a dense service. This type of search space configuration parameter includes a shorter search period, and the number of time units for continuous search in each search period is larger and the monitoring occasions in the time unit are more; the N sets of search space configuration parameter may also include a search space configuration parameter suitable for scheduling a sparse service. This type of search space configuration parameter includes a longer search period, and the number of time units for continuous search in each search period is smaller and the monitoring occasions in the time unit are fewer; similarly, the N sets of search space configuration parameter may include a search space configuration parameter suitable for a case of good channel quality, and this type of search space configuration parameter includes a less CCE aggregation degree in each monitoring occasion; the N sets of search space configuration parameter may also include a search space configuration parameter suitable for a case of poor channel quality. This type of search space configuration parameter includes a greater CCE aggregation degree in each monitoring occasion; the N sets of search space configuration parameter may include a search space configuration parameter suitable for a case of a heavy load. This type of search space configuration parameter includes more potential transmission positions of the PDCCH under each configured CCE aggregation degree; the N sets of search space configuration parameter may also include a search space configuration parameter suitable for a case of a small load. This type of search space configuration parameter includes fewer potential transmission positions of the PDCCH under each configured CCE aggregation degree; the N sets of search space configuration parameter may include search space configuration parameters suitable for different transmission/scheduling modes, and the search space configuration parameters suitable for different transmission/scheduling modes include different DCI formats (downlink control information format).

After configuring the search space for the terminal, the base station may use pre-configured N sets of search space configuration parameter as the multiple sets of search space configuration parameter configured for the terminal, or may also obtain M sets of search space configuration parameter from the N sets of search space configuration parameter as the multiple sets of search space configuration parameter configured for the terminal according to an initial state of the terminal, where M is an integer greater than or equal to 1 and less than or equal to N. Specifically, the base station presets a correspondence between an initial state and a search space configuration parameter, and the correspondence between the initial state and the search space configuration parameter characterizes that the N sets of search space configuration parameter correspond to different initial states, respectively, where if the initial state includes larger amount of data to be transmitted, the corresponding search space configuration parameter includes more potential transmission positions of the PDCCH under each configured CCE aggregation degree; if the initial state includes smaller amount of data to be transmitted, the corresponding search space configuration parameter includes fewer potential transmission positions of the PDCCH under each configured CCE aggregation degree; if a service type to be processed included in the initial state is a scheduling-dense service, the corresponding search space configuration parameter includes a shorter search period, and the number of time units for continuous search in each search period is larger and the monitoring occasions in the time unit are more; if a service type to be processed included in the initial state is a scheduling-sparse service, the corresponding search space configuration parameter includes a longer search period, and the number of time units for continuous search in each search period is smaller and the monitoring occasions in the time unit are fewer; if the channel quality included in the initial state is good, the corresponding search space configuration parameter includes a less CCE aggregation degree in each monitoring occasion; and if the channel quality included in the initial state is poor, the corresponding search space configuration parameter includes a greater CCE aggregation degree in each monitoring occasion.

After determining that the terminal has accessed, the base station may obtain the initial state of the terminal, which includes at least one of the amount of data to be transmitted, the service type to be processed, or the channel quality of the terminal, and then query the correspondence between the initial state and the search space configuration parameter to obtain the M sets of search space configuration parameter from the N sets of search space configuration parameter. For example, assuming that a duration of each time unit is 1 ms (milliseconds), the base station presets three sets of search space configuration parameter. A first set of search space configuration parameter includes a search period of 10 ms, and the number of time units for continuous search in each search period is eight, that is, the continuous search lasts 8 ms, monitoring occasions in the time unit are four times, CCE aggregation degrees in each monitoring occasion are 1, 2, and the potential transmission positions of the PDCCH under each configured CCE aggregation degree are 6, 6, the downlink control information format is DCI format A. A second set of search space configuration parameter includes a search period of 20 ms, and the number of time units for continuous search in each search period is four, that is, the continuous search lasts 4 ms, the monitoring occasions in the time unit are three times, the CCE aggregation degrees in each monitoring occasion are 2, 4, and the potential transmission positions of the PDCCH under each configured CCE aggregation degree are 6, 2, the downlink control information format is DCI format A. A third set of search space configuration parameter includes a search period of 40 ms, and the number of time units for continuous search in each search period is two, that is, the continuous search lasts 2 ms, the monitoring occasions in the time unit are two times, the CCE aggregation degrees in each monitoring occasion are 8, 16, and the potential transmission positions of the PDCCH under each configured CCE aggregation degree are 2, 2, the downlink control information format is DCI format A. At this time, the terminal performs the transmission/scheduling using a beamforming technology by default, and the DCI format A is a downlink control information format corresponding to the beamforming technology. In a practical application, the terminal may also adopt other transmission/scheduling modes, that is, the base station may also configure a DCI format corresponding to the other transmission/scheduling mode for the terminal, which is not limited by the embodiments of the present disclosure. If the initial state of the terminal obtained by the base station includes a larger amount of data to be transmitted, the service type to be processed being the scheduling-dense service, and good channel quality, the first set of search space configuration parameter and the second set of search space may be obtained as two sets of search space configuration parameter configured for the terminal. If the initial state of the terminal obtained by the base station includes a smaller amount of data to be transmitted, the service type to be processed being the scheduling-sparse service, and poor channel quality, the second set of search space configuration parameter and the third set of search space configuration parameter may be obtained as two sets of search space configuration parameter configured for the terminal Alternatively, in the practical application, after obtaining the initial state of the terminal, the base station may configure the multiple sets of search space configuration parameter for the terminal according to the initial state of the terminal. For example, the terminal performs the transmission/scheduling using the beamforming technology by default, and if the initial state of the terminal obtained by the base station includes a larger amount of data to be transmitted, the service type to be processed being the scheduling-dense service, and good channel quality, the base station may configure at least two sets of search space configuration parameter of which the search period is shorter, the number of time units for continuous search in each search period is larger, the monitoring occasions in the time unit are more, the CCE aggregation degrees in each monitoring occasion are smaller, the potential transmission locations of the PDCCH under each configured CCE aggregation degree are more, and the DCI format is the DCI format A for the terminal; and if the initial state of the terminal obtained by the base station includes a smaller amount of data to be transmitted, the service type to be processed being the scheduling-sparse service, and poor channel quality, the base station may configure at least two sets of search space configuration parameter of which the search period is longer, the number of time units for continuous search in each search period is smaller, the monitoring occasions in the time unit are fewer, the CCE aggregation degrees in each monitoring occasion are greater, the potential transmission locations of the PDCCH under each configured CCE aggregation degree are fewer, and the DCI format is the DCI format A for the terminal.

In the step 102, parameter configuration information is sent to the terminal. The parameter configuration information includes the multiple sets of search space configuration parameter, so that the terminal selects a search space configuration parameter corresponding to its current state from the multiple sets of search space configuration parameter for switching.

For example, the base station may send the parameter configuration information to the terminal through the high layer signaling, and the parameter configuration information includes the multiple sets of search space configuration parameter obtained by the base station. Optionally, the high layer signaling may be a RRC (Radio Resource Control) signaling.

In the technical solutions provided by the embodiments of the present disclosure, the base station may configure the multiple sets of search space configuration parameter for the terminal during initialization, so that when determining that the current state satisfies the preset condition, the terminal may obtain the search space configuration parameter needed for switching according to the current state, and perform the switching, avoiding time delay caused by adjustment of the search space configuration parameter through a high layer signaling sent by the base station, thereby realizing a solution in which the terminal adjusts the search space configuration parameter at an optimal occasion, and improving efficiency of the terminal to adjust the search space configuration parameter, and reducing power consumption of the terminal.

Figure 1B:
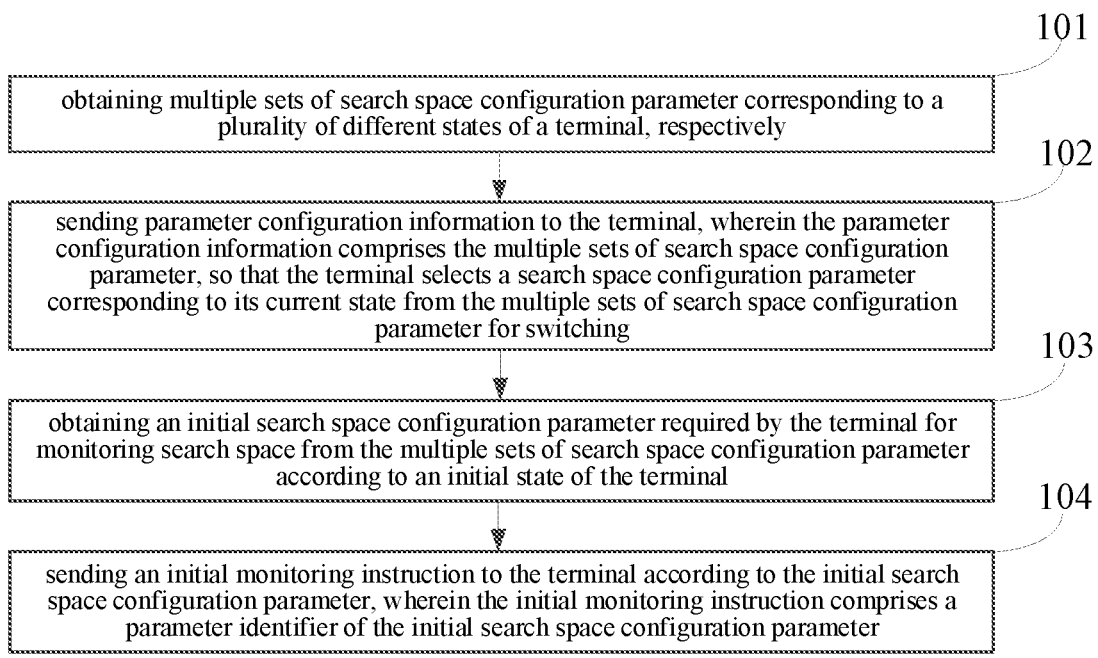
FIG. 1B is a flowchart showing a method for configuring and adjusting search space parameter according to an exemplary embodiment.

In an embodiment, as shown in FIG. 1B, the method further includes step 103 and step 104:

In the step 103, an initial search space configuration parameter required by the terminal for monitoring the search space is obtained from the multiple sets of search space configuration parameter according to the initial state of the terminal.

In the step 104, an initial monitoring instruction is sent to the terminal according to the initial search space configuration parameter, and the initial monitoring instruction includes a parameter identifier of the initial search space configuration parameter.

For example, after configuring the multiple sets of search space configuration parameter for the terminal, the base station may also indicate the initial search space configuration parameter for the terminal from the multiple sets of search space configuration parameter for the terminal to facilitate the terminal to monitor the search space using the initial search space configuration parameter.

Optionally, the base station may obtain the initial search space configuration parameter required by the terminal for monitoring search space from the multiple sets of search space configuration parameter according to the initial state of the terminal. If the initial state of the terminal includes a larger amount of data to be transmitted, the service type to be processed being the scheduling-dense service, and the good channel quality, in order to ensure the efficiency of data transmission at initial, the base station may specify a search space configuration parameter of which the search period is shorter, the number of time units for continuous search in each search period is larger, the monitoring occasions in the time unit are more, the CCE aggregation degrees in each monitoring occasion are smaller and/or the potential transmission locations of the PDCCH under each configured CCE aggregation degree are more as the initial search space configuration parameter; or if the initial state of the terminal includes a smaller amount of data to be transmitted, the service type to be processed being the scheduling-sparse service, and poor channel quality, in order to reduce the power consumption of the terminal at initial, the base station may specify a search space configuration parameter of which the search period is longer, the number of time units for continuous search in each search period is smaller, the monitoring occasions in the time unit are fewer, the CCE aggregation degrees in each monitoring occasion are greater and/or the potential transmission locations of the PDCCH under each configured CCE aggregation degree are fewer as the initial search space configuration parameter. For example, assuming that the base station obtains the first set of search space configuration parameter and the second set of search space configuration parameter from the first set of search space configuration parameter, the second set of search space configuration parameter, and the third set of search space configuration parameter which are set in advance as the two sets of search space configuration parameter configured for the terminal, that is, the initial state of the terminal includes a larger amount of data to be transmitted, the service type to be processed being the scheduling-dense service, and the good channel quality, and at this time, the base station may specify the first set of search space configuration parameter as the initial search space configuration parameter required by the terminal for monitoring the search space. Assuming that the base station obtains the second set of search space configuration parameter and the third set of search space configuration parameter as the two sets of search space configuration parameter configured for the terminal, that is, the initial state of the terminal includes a smaller amount of data to be transmitted, the service type to be processed being the scheduling-sparse service, and poor channel quality, and at this time, the base station may specify the third set of search space configuration parameter as the initial search space configuration parameter required by the terminal for monitoring the search space.

After determining the initial search space configuration parameter, the base station may send the initial monitoring instruction to the terminal, and the initial monitoring instruction includes a parameter identifier of the initial search space configuration parameter, so that the terminal may obtain the initial search space configuration parameter from the multiple sets of search space configuration parameter according to the parameter identifier. Optionally, the base station may add the initial monitoring instruction to the parameter configuration information and send it to the terminal, that is, the parameter configuration information sent by the base station to the terminal includes the multiple sets of search space configuration parameter and the initial monitoring instruction configured for the terminal. In the practical application, the base station may also send the initial monitoring instruction to the terminal through another preset signaling or preset information, which is not limited by the embodiments of the present disclosure.

In the technical solutions provided by the embodiments of the present disclosure, the base station may indicate the initial search space configuration parameter required by the terminal for monitoring the search space according to the initial state of the terminal, which prevents a situation in which the terminal uses an inappropriate search space configuration parameter to detect the search space in the initial state, causing resource waste, and further reduces the power consumption of the terminal.

Figure 1C:
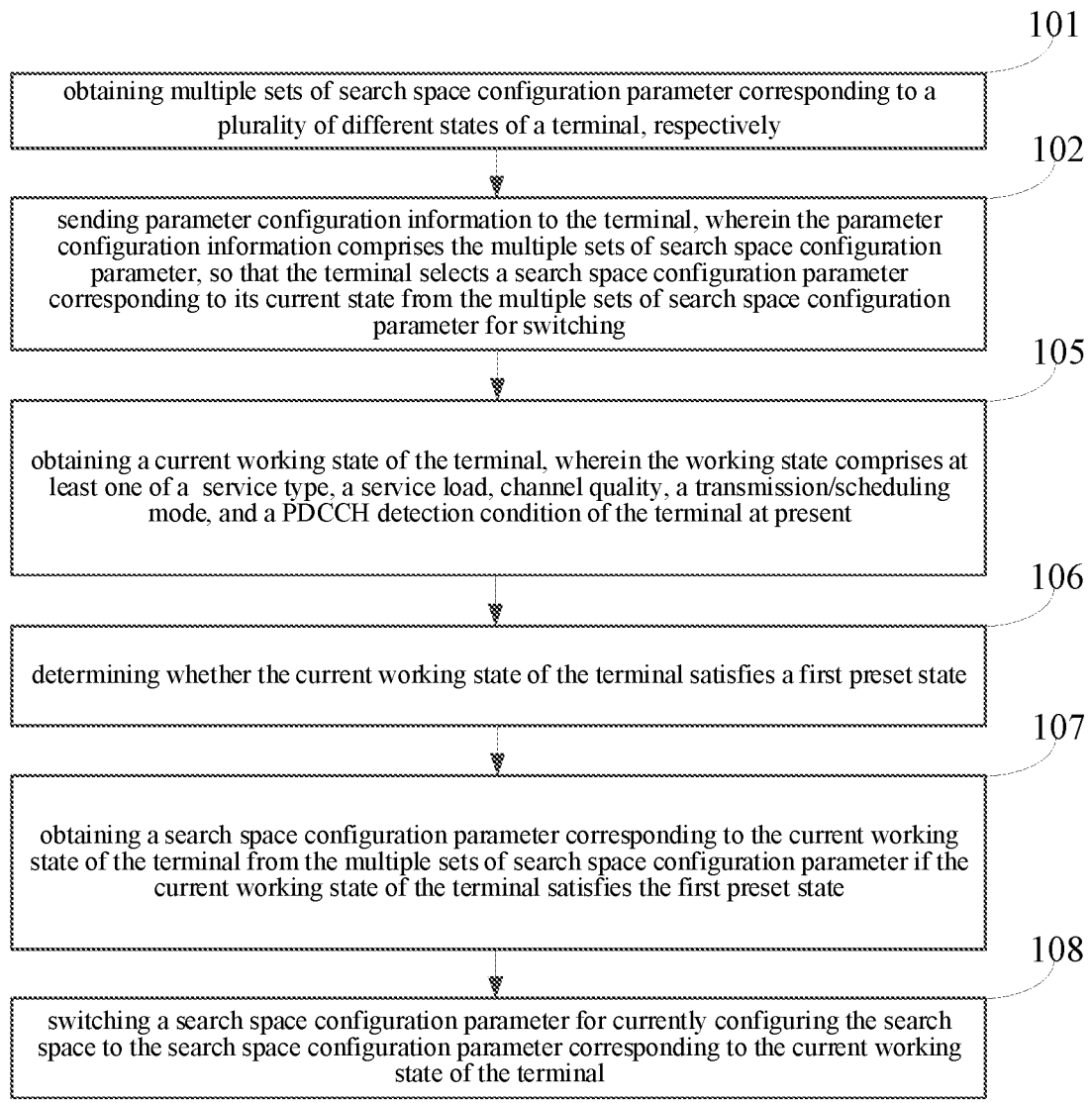
FIG. 1C is a flowchart showing a method for configuring and adjusting search space parameter according to an exemplary embodiment.

In an embodiment, as shown in FIG. 1C, the method further includes step 105 to step 108:

In the step 105, a current working state of the terminal is obtained, and the working state includes at least one of a service type, a service load, channel quality, a transmission/scheduling mode, and a PDCCH detection condition of the terminal at present.

In the step 106, it is determined whether the current working state of the terminal satisfies a first preset state.

In the step 107, if the current working state of the terminal satisfies the first preset state, a search space configuration parameter corresponding to the current working state of the terminal is obtained from the multiple sets of search space configuration parameter.

In the step 108, a search space configuration parameter for currently configuring the search space is switched to the search space configuration parameter corresponding to the current working state of the terminal.

The base station and the terminal may agree on the first preset state in advance, and when the working state of the terminal satisfies the first preset state, the base station obtains the search space configuration parameter corresponding to the current working state of the terminal from the multiple sets of search space configuration parameter, and switch the currently used search space configuration parameter when the DCI is sent to the terminal through the PDCCH to the search space configuration parameter corresponding to the current working state of the terminal. At the same time, the terminal obtains the search space configuration parameter corresponding to the current working state from the multiple sets of search space configuration parameter, and switches the search space configuration parameter for currently monitoring the search space to the search space configuration parameter corresponding to the current working state of the terminal, thereby using the search space configuration parameter corresponding to the current working state of the terminal to continue searching for the space. Through the first preset state agreed by the terminal and the base station in advance, a solution in which the base station and the terminal switch the parameters synchronously is realized, which further improves the efficiency of the terminal in adjusting the search space configuration parameters, and reduces the power consumption of the terminal.

For example, the first preset state agreed by the base station and the terminal may be "a current service type of the terminal is a scheduling-sparse service". Assuming that the two sets of search space configuration parameter configured by the base station for the terminal are the first set of search space configuration parameter and the second set of search space configuration parameter, respectively, and the terminal currently uses the first set of search space configuration parameter to monitor the search space, the base station also uses the first set of search space configuration parameter to configure the search space at this time. The base station obtains the current service type of the terminal in real time. If the service type is the scheduling-sparse service, it is confirmed that the current working state of the terminal satisfies the first preset state. At this time, the base station may determine the second set of search space configuration parameter of which the search period is longer, the number of time units for continuous search in each search period is smaller, and the monitoring occasions in the time unit are fewer as the search space configuration parameter corresponding to the current working state of the terminal, and uses the second set of search space configuration parameter to reconfigure the search space, and sends the DCI to the terminal through a PDCCH of the reconfigured search space. At the same time, the terminal may also determine that the current service type is the scheduling-sparse service, that is, it is determined that the current working state satisfies the first preset state, the terminal may switch the first set of search space configuration parameter for currently monitoring the search space to the second set of search space configuration parameter, that is, the second set of search space configuration parameter is used to continue monitoring the search space, which realizes the solution in which the base station and the terminal switch the parameters synchronously.

Alternatively, the first preset state agreed by the base station and the terminal may also be "a current service type of the terminal is a scheduling-dense service". Assuming that the search space configuration parameter for currently monitoring the search space by the terminal is the second set of search space configuration parameter, that is, the base station currently uses the second set of search space configuration parameter to configure the search space at this time. The base station may obtain the current service type of the terminal in real time. If the service type is the scheduling-dense service, it is confirmed that the current working state of the terminal satisfies the first preset state. At this time, the base station may obtain the first set of search space configuration parameter of which the search period is shorter, the number of time units for continuous search in each search period is larger, and the monitoring occasions in the time unit are more as the search space configuration parameter corresponding to the current working state of the terminal, and uses the first set of search space configuration parameter to reconfigure the search space, and sends the DCI to the terminal through the PDCCH of the reconfigured search space. At the same time, the terminal may also determine that the current service type is the scheduling-dense service, that is, it is determined that the current working state satisfies the first preset state, the terminal may switch the second set of search space configuration parameter for currently monitoring the search space to the first set of search space configuration parameter, that is, the first set of search space configuration parameter is used to continue monitoring the search space, which realizes the solution in which the base station and the terminal switch the parameters synchronously.

For example, the first preset state agreed by the base station and the terminal may be "a current channel quality of the terminal is greater than or equal to a first preset threshold". Assuming that the two sets of search space configuration parameter configured by the base station for the terminal are the first set of search space configuration parameter and the second set of search space configuration parameter, respectively, and the search space configuration parameter for currently monitoring the search space by the terminal is the second set of search space configuration parameter, that is, the base station currently uses the second set of search space configuration parameter to configure the search space at this time. When the terminal is monitoring the search space, it may report the current channel quality to the base station in real time, and the base station may determine whether the channel quality reported by the terminal is greater than or equal to the first preset threshold in real time. If the channel quality is greater than or equal to the first preset threshold, it is confirmed that the current working state of the terminal satisfies the first preset state. At this time, the channel quality is good, and the base station may obtain the first set of search space configuration parameter of which the CCE aggregation degrees in each monitoring occasion are smaller as the search space configuration parameter corresponding to the current working state of the terminal, and uses the first set of search space configuration parameter to reconfigure the search space, and sends the DCI to the terminal through the PDCCH of the reconfigured search space. At the same time, the terminal may also determine that the channel quality is greater than or equal to the first preset threshold, and at this time, the terminal may switch the second set of search space configuration parameter for currently monitoring the search space to the first set of search space configuration parameter, that is, the first set of search space configuration parameter is used to continue monitoring the search space, which realizes the solution in which the base station and the terminal switch the parameters synchronously.

Alternatively, the first preset state agreed by the base station and the terminal may also be "the current channel quality of the terminal is less than or equal to a second preset threshold", where the second preset threshold is less than the first preset threshold. Assuming that the search space configuration parameter for currently monitoring the search space by the terminal is the first set of search space configuration parameter, that is, the base station currently uses the first set of search space configuration parameter to configure the search space at this time. The base station may determine whether the channel quality reported by the terminal is less than or equal to the second preset threshold in real time. If the channel quality is less than or equal to the second preset threshold, it is confirmed that the current working state of the terminal satisfies the first preset state. That is, at this time, the channel quality is poor, and the base station may obtain the second set of search space configuration parameter of which the CCE aggregation degrees in each monitoring occasion are greater as the search space configuration parameter corresponding to the current working state of the terminal, and uses the second set of search space configuration parameter to reconfigure the search space, and sends the DCI to the terminal through a PDCCH of the reconfigured search space. At the same time, the terminal may also determine that the channel quality is less than or equal to the second preset threshold, and at this time, the terminal may switch the first set of search space configuration parameter for currently monitoring the search space to the second set of search space configuration parameter, that is, the second set of search space configuration parameter is used to continue monitoring the search space, which realizes the solution in which the base station and the terminal switch the parameters synchronously.

Alternatively, the base station and the terminal may also agree on the first preset state according to a PDCCH detection condition. The PDCCH detection condition may be a number of times, time or period of continuous transmission/detection of PDCCH, or a number of times, time or period of continuous non-transmission/non-detection of PDCCH. Assuming that the first preset state agreed by the base station and the terminal is "the number of times of continuous non-transmission/non-detection of PDCCH is greater than or equal to a preset threshold of number of times". The two sets of search space configuration parameter configured by the base station for the terminal are the first set of search space configuration parameter and the second set of search space configuration parameter, respectively, and the terminal currently uses the first set of search space configuration parameter to monitor the search space, and the base station also uses the first set of search space configuration parameter to configure the search space at this time. The base station may record the number of times of continuous non-transmission of PDCCH in real time, and then determine whether the number of times is greater than or equal to the preset threshold of number of times. If the number of times is greater than or equal to the preset threshold of number of times, it indicates that the terminal is currently running the scheduling-sparse service, and it is confirmed that the current working state of the terminal satisfies the first preset state at this time, and the second set of search space configuration parameter of which the search period is longer, the number of time units for continuous search in each search period is smaller, and the monitoring occasions in the time unit are fewer is obtained and determined as the search space configuration parameter corresponding to the current working state of the terminal, and the second set of search space configuration parameter is used to reconfigure the search space, and the DCI is sent to the terminal through a PDCCH of the reconfigured search space. The terminal may also record the number of times of continuous non-detection of PDCCH in real time, and then determine whether the number of times is greater than or equal to the preset threshold of number of times. If the number of times is greater than or equal to the preset threshold of number of times, it is confirmed that the current working state satisfies the first preset state at this time, and the terminal may switch the first set of search space configuration parameter for currently monitoring the search space to the second set of search space configuration parameter, that is, the second set of search space configuration parameter is used to continue monitoring the search space, which realizes the solution in which the base station and the terminal switch the parameters synchronously. Optionally, the first preset state agreed by the base station and the terminal may also be "the number of times of continuous transmission/detection of PDCCH is greater than or equal to the preset threshold of number of times", "a time of continuous transmission/detection of PDCCH is greater than or equal to a preset time threshold", "a period of continuous transmission/detection of PDCCH is greater than or equal to a preset period threshold", "a time of continuous non-transmission/non-detection of PDCCH is greater than or equal to the preset time threshold", or "a period of continuous non-transmission/non-detection of PDCCH is greater than or equal to the preset period threshold", etc., which is not limited in the embodiments of the present disclosure.

In the practical application, the base station may also obtain the service load and the transmission/scheduling mode of the terminal, and determine whether the current working state of the terminal satisfies the first preset state according to the service load and the transmission/scheduling mode of the terminal, and the corresponding determining process may refer to the above embodiments of the service type and the channel quality, which is not repeated here by the embodiments of the present disclosure.

Optionally, the correspondence between the state and the search space configuration parameter may be configured by the base station or preset according to rules. The correspondence between the state and the search space configuration parameter characterizes the multiple sets of search space configuration parameter configured by the base station for the terminal correspond to a plurality of different working states, respectively. For example, when the service type included in the working state is the scheduling-dense service, the corresponding search space configuration parameter includes a shorter search period, a larger number of time units for continuous search in each search period, and more monitoring occasions in the time unit; when the service type included in the working state is the scheduling-sparse service, the corresponding search space configuration parameter includes a longer search period, a smaller number of time units for continuous search in each search period, and fewer monitoring occasions in the time unit; when the service load included in the working state is larger, the corresponding search space configuration parameter includes fewer potential transmission positions of PDCCH; when the service load included in the working state is smaller, the corresponding search space configuration parameter includes more potential transmission positions of PDCCH; when the channel quality included in the working state is good, the corresponding search space configuration parameter includes a smaller CCE aggregation degree in each monitoring occasion; when the channel quality included in the working state is poor, the corresponding search space configuration parameter includes a greater CCE aggregation degree in each monitoring occasion; the PDCCH detection conditions included in the working state are different, and the corresponding search space configuration parameters are different; or the transmission/scheduling modes included in the working state are different, and the corresponding search space configuration parameters are also different. After obtaining the current working state of the terminal, the base station or the terminal may query the correspondence between the state and the search space configuration parameter, and obtain the search space configuration parameter corresponding to the current working state.

In the technical solutions provided by the embodiments of the present disclosure, the base station may adjust the configuration parameters for setting the search space according to the working state of the terminal, and the terminal may simultaneously switch the search space configuration parameters, which improves autonomy of the terminal to switch the search space configuration parameters, and further improves the efficiency of the terminal to adjust the search space configuration parameters, and reduces the power consumption of the terminal.

Figure 1D:
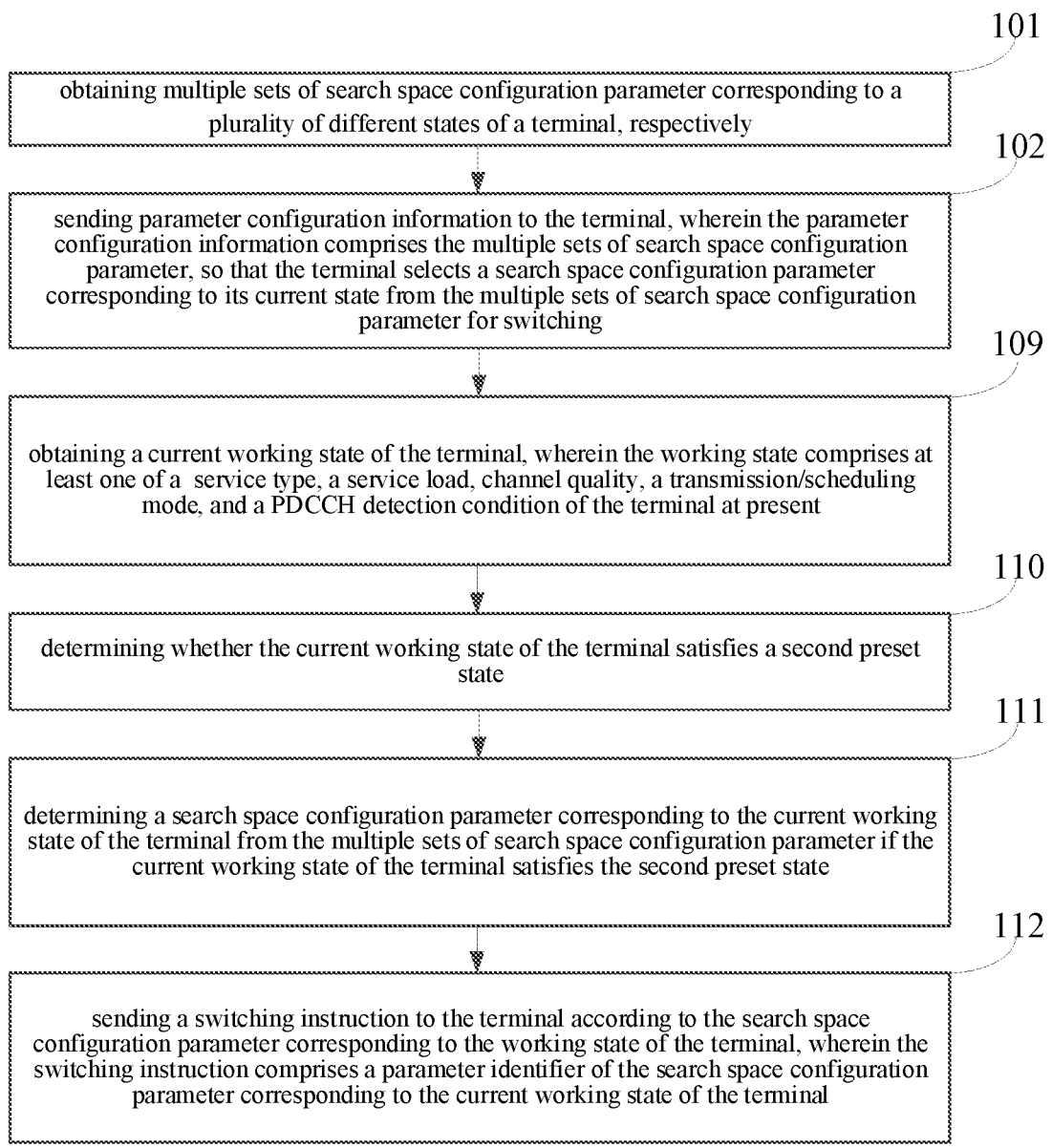
FIG. 1D is a flowchart showing a method for configuring and adjusting search space parameter according to an exemplary embodiment.

In an embodiment, as shown in FIG. 1D, the method further includes step 109 to step 112:

In the step 109, a current working state of the terminal is obtained, and the working state includes at least one of a service type, a service load, channel quality, a transmission/scheduling mode, and a PDCCH detection condition of the terminal at present In the step 110, it is determined whether the current working state of the terminal satisfies a second preset state.

In the step 111, if the current working state of the terminal satisfies the second preset state, the search space configuration parameter corresponding to the current working state of the terminal is determined from the multiple sets of search space configuration parameter.

In the step 112, a switching instruction is sent to the terminal according to the search space configuration parameter corresponding to the working state, and the switching instruction includes a parameter identifier of the search space configuration parameter corresponding to the current working state of the terminal.

The base station may preset the second preset state. During a process of the terminal monitoring the search space, the base station may obtain the current working state of the terminal in real time, and then determine whether the working state satisfies the second preset state, and determine the search space configuration parameter corresponding to the current working state of the terminal from the multiple sets of search space configuration parameter when the working state satisfies the second preset state, thereby sending the switching instruction to the terminal according to the search space configuration parameter corresponding to the working state, so that the terminal may determine the search space configuration parameter corresponding to the current working state of the terminal from the multiple sets of search space configuration parameter according to the parameter identifier included in the switching instruction, and switch the search space configuration parameter for currently monitoring the search space to the search space configuration parameter corresponding to the current working state of the terminal.

For example, the second preset state preset by the base station may be "the current service type of the terminal is the scheduling-sparse service". Assuming that the two sets of search space configuration parameter configured by the base station for the terminal are the first set of search space configuration parameter and the second set of search space configuration parameter, respectively, and the terminal currently uses the first set of search space configuration parameter to monitor the search space. That is, the base station currently uses the first set of search space configuration parameter to configure the search space at this time. The base station obtains the current service type of the terminal in real time. If the service type is the scheduling-sparse service, it is confirmed that the current working state of the terminal satisfies the second preset state. At this time, the base station may obtain the second set of search space configuration parameter of which the search period is longer, the number of time units for continuous search in each search period is smaller, and the monitoring occasions in the time unit are fewer as the search space configuration parameter corresponding to the current working state of the terminal, and sends the switching instruction to the terminal according to the second set of search space configuration parameter, and the switching instruction includes a parameter identifier of the second set of search space configuration parameter. After receiving the switching instruction, the terminal may determine the second set of search space configuration parameter as the search space configuration parameter corresponding to the current working state according to the parameter identifier included in the switching instruction, thereby switching the search space configuration parameter for currently monitoring the search space to the second set of search space configuration parameter. At the same time, the base station also uses the second set of search space configuration parameter to configure the search space, which realizes the solution in which the base station and the terminal switch the parameters synchronously.

Alternatively, the second preset state preset by the base station may be "the current service type of the terminal is a scheduling-dense service". Assuming that the search space configuration parameter for currently monitoring the search space by the terminal is the second set of search space configuration parameter, that is, the base station currently uses the second set of search space configuration parameter to configure the search space at this time. The base station may obtain the current service type of the terminal in real time. If the service type is the scheduling-dense service, it is confirmed that the current working state of the terminal satisfies the second preset state. At this time, the base station may obtain the first set of search space configuration parameter of which the search period is shorter, the number of time units for continuous search in each search period is larger, and the monitoring occasions in the time unit are more as the search space configuration parameter corresponding to the current working state of the terminal, and sends the switching instruction to the terminal according to the first set of search space configuration parameter, and the switching instruction includes a parameter identifier of the first set of search space configuration parameter. After receiving the switching instruction, the terminal may determine the first set of search space configuration parameter as the search space configuration parameter corresponding to the current working state according to the parameter identifier included in the switching instruction, thereby switching the search space configuration parameter for currently monitoring the search space to the first set of search space configuration parameter. At the same time, the base station also uses the first set of search space configuration parameter to configure the search space, which realizes the solution in which the base station and the terminal switch the parameters synchronously.

For example, the second preset state preset by the base station may be "the current channel quality of the terminal is greater than or equal to the first preset threshold". Assuming that the two sets of search space configuration parameter configured by the base station for the terminal are the first set of search space configuration parameter and the second set of search space configuration parameter, respectively, and the search space configuration parameter for currently monitoring the search space by the terminal is the second set of search space configuration parameter, that is, the base station currently uses the second set of search space configuration parameter to configure the search space at this time. When the terminal is monitoring the search space, it may report the current channel quality to the base station in real time, and the base station may determine whether the channel quality reported by the terminal is greater than or equal to the first preset threshold in real time. If the channel quality is greater than or equal to the first preset threshold, it is confirmed that the current working state of the terminal satisfies the second preset state, and it indicates that the channel quality is good, and at this time, the base station may obtain the first set of search space configuration parameter of which the CCE aggregation degrees in each monitoring occasion are smaller as the search space configuration parameter corresponding to the current working state of the terminal, and sends the switching instruction to the terminal according to the first set of search space configuration parameter, and the switching instruction includes a parameter identifier of the first set of search space configuration parameter. After receiving the switching instruction, the terminal may determine the first set of search space configuration parameter as the search space configuration parameter corresponding to the current working state according to the parameter identifier included in the switching instruction, thereby switching the search search space to the first set of search space configuration parameter. At the same time, the base station also uses the first set of search space configuration parameter to configure the search space, which realizes the solution in which the base station and the terminal switch the parameters synchronously.

Alternatively, the second preset state preset by the base station may be "the current channel quality of the terminal is less than or equal to the second preset threshold", where the second preset threshold is less than the first preset threshold. Assuming that the search space configuration parameter for currently monitoring the search space by the terminal is the first set of search space configuration parameter, that is, the base station currently uses the first set of search space configuration parameter to configure the search space at this time. The base station may determine whether the channel quality reported by the terminal is less than or equal to the second preset threshold in real time. If the channel quality is less than or equal to the second preset threshold, it is confirmed that the current working state of the terminal satisfies the second preset state, and it indicates that the channel quality is poor, and at this time, the base station may obtain the second set of search space configuration parameter of which the CCE aggregation degrees in each monitoring occasion are greater as the search space configuration parameter corresponding to the current working state of the terminal, and sends the switching instruction to the terminal according to the second set of search space configuration parameter, and the switching instruction includes a parameter identifier of the second set of search space configuration parameter. After receiving the switching instruction, the terminal may determine the second set of search space configuration parameter as the search space configuration parameter corresponding to the current working state according to the parameter identifier included in the switching instruction, thereby switching the search space configuration parameter for currently monitoring the search space to the second set of search space configuration parameter. At the same time, the base station also uses the second set of search space configuration parameter to configure the search space, which realizes the solution in which the base station and the terminal switch the parameters synchronously.

In the practical application, the base station may also obtain the service load, the transmission/scheduling mode, or the PDCCH detection condition of the terminal, and determine whether the current working state of the terminal satisfies the second preset state according to the service load, the transmission/scheduling mode, or the PDCCH detection condition of the terminal, and the corresponding determining process may refer to the above embodiments of the service type and the channel quality, which is not repeated here by the embodiments of the present disclosure.

Optionally, the base station may send the switching instruction to the terminal by a form of writing a preset character into a target field of the preset DCI. For example, the base station and the terminal may agree in advance that if a non-zero character exists in the target field of the preset DCI, it indicates that the target field carries the switching instruction, and the character in the target field is the parameter identifier included in the switching instruction. Assuming that a parameter identifier corresponding to the first set of search space configuration parameter is 01, and a parameter identifier corresponding to the second set of search space configuration parameter is 10. When determining that the first set of search space configuration parameter is the search space configuration parameter corresponding to the current working state of the terminal, the base station may write characters 01 into the target field of the preset DCI when sending the preset DCI to the terminal. The terminal may receive the preset DCI by monitoring the search space, and then read that the characters of the target field of the preset DCI are 01. At this time, the terminal may determine whether there is a parameter identifier that matches the characters 01 among a plurality of parameter identifiers corresponding to the pre-configured multiple sets of search space configuration parameter respectively, that is, determining whether there is a search space configuration parameter whose parameter identifier is the characters 01 among the pre-configured multiple sets of search space configuration parameter. If so, it is confirmed that the switching instruction sent by the base station is received, and the first set of search space configuration parameter whose parameter identifier is the characters 01 is used as the search space configuration parameter corresponding to the current working state of the terminal, that is, the terminal may switch the second set of search space configuration parameter for currently monitoring the search space to the first set of search space configuration parameter. When determining that the second set of search space configuration parameter is the search space configuration parameter corresponding to the current working state of the terminal, the base station may write the characters 10 into the target field of the preset DCI when sending the preset DCI to the terminal. The terminal may receive the preset DCI by monitoring the search space, and then read that the characters in the target field of the preset DCI are 10. At this time, the terminal may determine whether there is a parameter identifier that matches the characters 10 among the plurality of parameter identifiers corresponding to the pre-configured multiple sets of search space configuration parameter respectively, that is, determining whether there is a search space configuration parameter whose parameter identifier is the characters 10 among the pre-configured multiple sets of search space configuration parameter. If so, it is confirmed that the switching instruction sent by the base station is received, and the second set of search space configuration parameter whose parameter identifier is the characters 10 is used as the search space configuration parameter corresponding to the current working state of the terminal, that is, the terminal may switch the first set of search space configuration parameter for currently monitoring the search space to the second set of search space configuration parameter. Optionally, the preset DCI may be a DCI currently scheduled by the terminal, or may be a newly introduced DCI, which is not limited in the embodiments of the present disclosure.

Alternatively, the base station may also send the switching instruction to the terminal through a target control channel. For example, the base station and the terminal may agree in advance that if a non-zero character exists in the target control channel, it indicates that the target control channel carries the switching instruction, and the character send by the target control channel is the parameter identifier included in the switching instruction. Assuming that a parameter identifier corresponding to the first set of search space configuration parameter is 01, and a parameter identifier corresponding to the second set of search space configuration parameter is 10. When determining that the first set of search space configuration parameter is the search space configuration parameter corresponding to the current working state of the terminal, the base station may send the characters 01 to the terminal through the target control channel. The terminal may listen to the target control channel. If it is monitored that the target control channel transmits the characters 01, the terminal determines whether there is a parameter identifier that matches the characters 01 among a plurality of parameter identifiers corresponding to the pre-configured multiple sets of search space configuration parameter respectively, that is, determining whether there is a search space configuration parameter whose parameter identifier is the characters 01 among the pre-configured multiple sets of search space configuration parameter. If so, it is confirmed that the switching instruction is received, and the first set of search space configuration parameter whose parameter identifier is the characters 01 is used as the search space configuration parameter corresponding to the current working state of the terminal, that is, the terminal may switch the second set of search space configuration parameter for currently monitoring the search space to the first set of search space configuration parameter. When determining that the second set of search space configuration parameter is the search space configuration parameter corresponding to the current working state of the terminal, the base station may send the characters 10 to the terminal through the target control channel. The terminal may listen to the target control channel. If it is monitored that the target control channel transmits the characters 10, the terminal determines whether there is a parameter identifier that matches the characters 10 among the plurality of parameter identifiers corresponding to the pre-configured multiple sets of search space configuration parameter respectively, that is, determining whether there is a search space configuration parameter whose parameter identifier is the characters 10 among the pre-configured multiple sets of search space configuration parameter. If so, it is confirmed that the switching instruction sent by the base station is received, and the second set of search space configuration parameter whose parameter identifier is the characters 10 is used as the search space configuration parameter corresponding to the current working state of the terminal, that is, the terminal may switch the first set of search space configuration parameter for currently monitoring the search space to the second set of search space configuration parameter. Optionally, the base station may notify the terminal of a listening parameter of the target control channel through broadcast information, and the terminal may listen to the target control channel in real time according to the listening parameter; or, the base station may also add the listening parameter of the target control channel to the parameter configuration information when sending the parameter configuration information to the terminal, and then send it to the terminal; or the base station may also send the listening parameter of the target control channel to the terminal through another RRC signaling, which is not limited in the embodiments of the present disclosure.

Alternatively, the base station may also send the switching instruction to the terminal by a form of writing preset characters into a target field of a preset MAC (Media Access Control) layer message. For example, the base station and the terminal may agree in advance that if a non-zero character exists in the target field of the preset MAC layer message, it indicates that the target field carries the switching instruction, and the character in the target field is the parameter identifier included in the switching instruction. Assuming that a parameter identifier corresponding to the first set of search space configuration parameter is 01, and a parameter identifier corresponding to the second set of search space configuration parameter is 10. When determining that the first set of search space configuration parameter is the search space configuration parameter corresponding to the current working state of the terminal, the base station may write characters 01 into the target field of the preset MAC layer message when sending the preset MAC layer message to the terminal. The terminal may receive the preset MAC layer message, and then read that the characters of the target field of the preset MAC layer message are 01. At this time, the terminal may determine whether there is a parameter identifier that matches the characters 01 among a plurality of parameter identifiers corresponding to the pre-configured multiple sets of search space configuration parameter respectively, that is, determining whether there is a search space configuration parameter whose parameter identifier is the characters 01 among the pre-configured multiple sets of search space configuration parameter. If so, it is confirmed that the switching instruction sent by the base station is received, and the first set of search space configuration parameter whose parameter identifier is the characters 01 is used as the search space configuration parameter corresponding to the current working state of the terminal, that is, the terminal may switch the second set of search space configuration parameter for currently monitoring the search space to the first set of search space configuration parameter. When determining that the second set of search space configuration parameter is the search space configuration parameter corresponding to the current working state of the terminal, the base station may write the characters 10 into the target field of the preset MAC layer message when sending the preset MAC layer message to the terminal. The terminal may receive the preset MAC layer message by monitoring the search space, and then read that the characters in the target field of the preset MAC layer message are 10. At this time, the terminal may determine whether there is a parameter identifier that matches the characters 10 among the plurality of parameter identifiers corresponding to the pre-configured multiple sets of search space configuration parameter respectively, that is, determining whether there is a search space configuration parameter whose parameter identifier is the characters 10 among the pre-configured multiple sets of search space configuration parameter. If so, it is confirmed that the switching instruction sent by the base station is received, and the second set of search space configuration parameter whose parameter identifier is the characters 10 is used as the search space configuration parameter corresponding to the current working state of the terminal, that is, the terminal may switch the first set of search space configuration parameter for currently monitoring the search space to the second set of search space configuration parameter.

In the technical solutions provided by the embodiment of the present disclosure, the base station may instruct the terminal to switch between the multiple sets of search space configuration parameter according to the working state of the terminal, which improves the efficiency of the terminal in adjusting the search space configuration parameters and reduces the power consumption of the terminal.

Figure 1E:
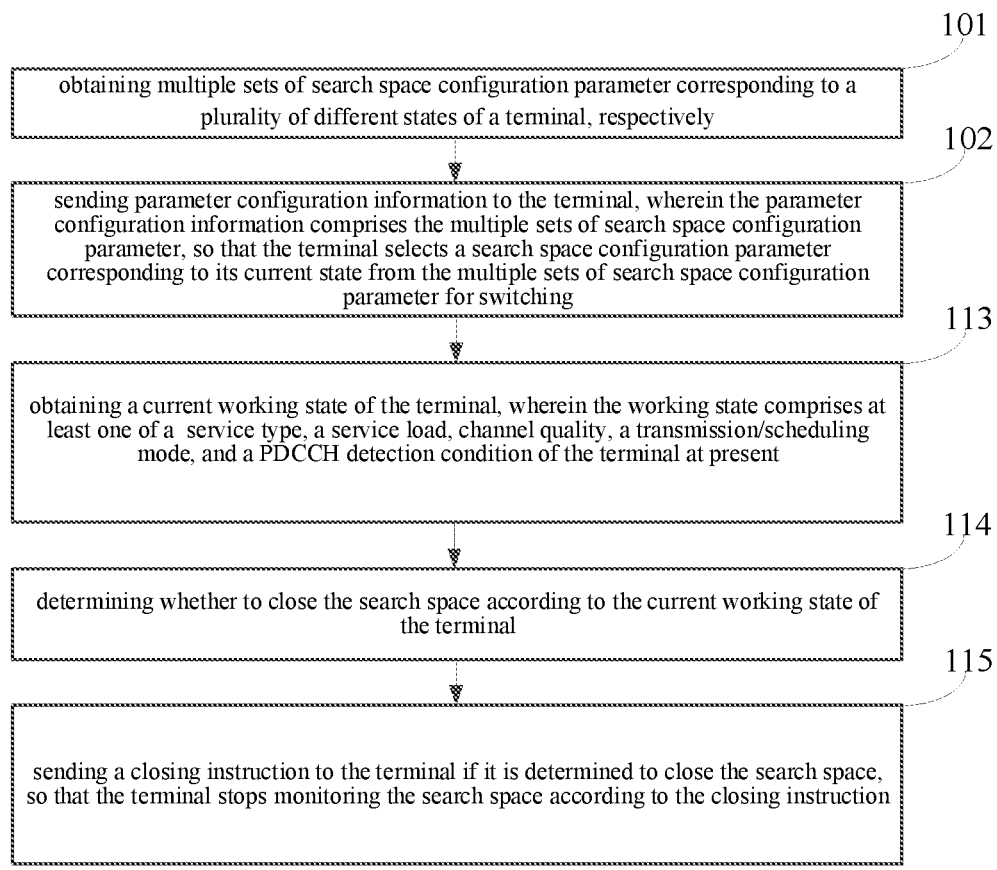
FIG. 1E is a flowchart showing a method for configuring and adjusting search space parameter according to an exemplary embodiment.

In an embodiment, as shown in FIG. 1E, the method further includes step 113 to step 115:

In the step 113, a current working state of the terminal is obtained, and the working state includes at least one of a service type, a service load, channel quality, a transmission/scheduling mode, and a PDCCH detection condition of the terminal at present.

In the step 114, it is determined whether to close the search space according to the current working state of the terminal.

In the step 115, if it is determined to close the search space, a closing instruction is sent to the terminal, so that the terminal stops monitoring the search space according to the closing instruction.

For example, the base station may obtain the current working state of the terminal in real time, and then determine whether to close the search space according to the current working state of the terminal. Optionally, the base station may obtain the current service type of the terminal, and then determine whether the service type is the scheduling-sparse service. If the service type is the scheduling-sparse service, it is confirmed that the search space may be closed. At this time, the base station may send the closing instruction to the terminal, and the terminal may stop monitoring the search space according to the closing instruction. Alternatively, the base station may obtain the current service load of the terminal, and then determine whether the service load is less than or equal to the preset load threshold. If the service load is less than or equal to the preset load threshold, it is confirmed that the search space may be closed. At this time, the base station may send the closing instruction to the terminal, and the terminal may stop monitoring the search space according to the closing instruction. In the practical application, the base station may also obtain the current channel quality, the transmission/scheduling mode, or the PDCCH detection condition of the terminal, and then determine whether to close the search space according to the current channel quality, the transmission/scheduling mode, or the PDCCH detection condition of the terminal, thereby determining whether to send the closing instruction to the terminal. Specific implementations may refer to the above embodiments of the service type and the service load.

Optionally, the base station may send the closing instruction to the terminal by a form of writing a preset closing character into a reference field of the preset DCI. For example, the base station and the terminal may agree in advance that if the preset closing character exists in the reference field of the preset DCI, it indicates that the closing instruction is received. Assuming that preset closing characters are 00, and when determining that the search space needs to be closed, the base station may write the characters 00 in the reference field of the preset DCI when sending the preset DCI to the terminal. The terminal may receive the preset DCI by monitoring the search space, and then reads that the characters in the reference field of the preset DCI are 00. At this time, the terminal confirms that it has received the closing instruction and stops monitoring the search space. The reference field may be any field different from the target field.

Alternatively, the base station may also send the closing instruction to the terminal through a reference control channel. For example, the base station and the terminal may agree in advance that if the reference control channel transmits a non-zero character, it indicates that the closing instruction is received. The terminal may listen to the reference control channel. If the reference control channel transmits the non-zero character, it is confirmed that the closing instruction is received, and the terminal stops monitoring the search space at this time.

Optionally, the base station may notify the terminal of a listening parameter of the reference control channel through broadcast information, and the terminal may listen to the reference control channel according to the listening parameter in real time; or, the base station may also add the listening parameter of the reference control channel to the parameter configuration information when sending the parameter configuration information to the terminal, and then send it to the terminal; or the base station may also send the listening parameter of the reference control channel to the terminal through another RRC signaling, which is not limited in the embodiments of the present disclosure.

In the technical solutions provided by the embodiments of the present disclosure, the base station may determine whether the search space needs to be closed according to the current working state of the terminal, and instruct the terminal to stop monitoring the search space when the search space needs to be closed, thereby further reducing the power consumption of the terminal.

Terminal Side

Figure 2A:
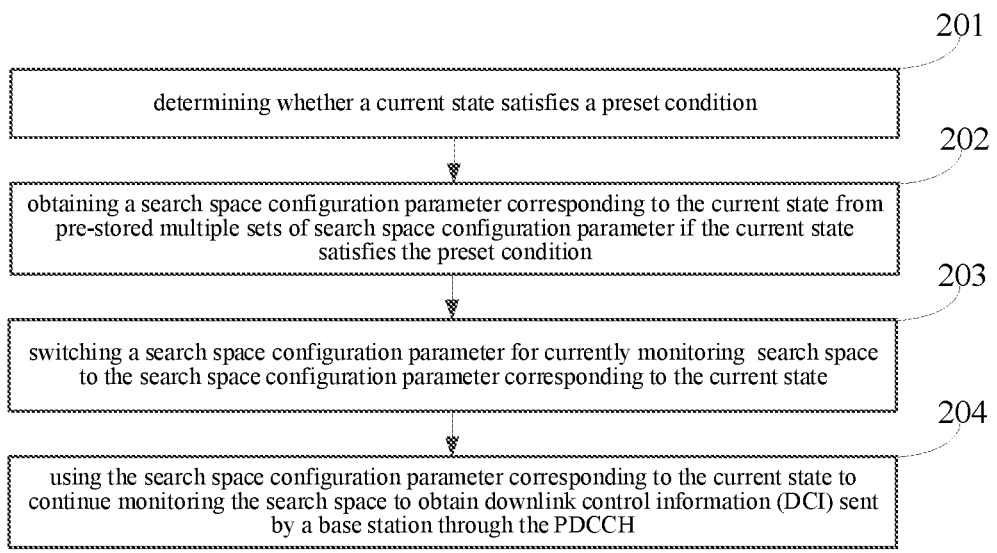
FIG. 2A is a flowchart showing a method for configuring and adjusting search space parameter according to an exemplary embodiment.

FIG. 2A is a flowchart showing a method for configuring and adjusting search space parameter according to an exemplary embodiment. The method for configuring and adjusting search space parameter is applied to a terminal. As shown in FIG. 2A, the method includes the following steps 201 to 204:

In the step 201, it is determined whether a current state satisfies a preset condition.

In the step 202, if the current state satisfies the preset condition, a search space configuration parameter corresponding to the current state is obtained from pre-stored multiple sets of search space configuration parameter.

Each set of search space configuration parameter includes at least one of a search period, a number of time units for continuous search in each search period, a monitoring occasion in the time unit, a CCE aggregation degree in each monitoring occasion, a potential transmission position of a PDCCH under each CCE aggregation degree, and a downlink control information format.

In the step 203, a search space configuration parameter for currently monitoring search space is switched to the search space configuration parameter corresponding to the current state.

In the step 204, the search space configuration parameter corresponding to the current state are used to continue monitoring the search space to obtain downlink control information (DCI) sent by a base station through the PDCCH.

After the terminal accesses the base station, the base station may first configure search space for the terminal, and then obtain the multiple sets of search space configuration parameter configured for the terminal according to preset rules and indicate an initial search space configuration parameter required by the terminal for monitoring the search space. For example, the base station may obtain the multiple sets of search space configuration parameter configured for the terminal, and then send parameter configuration information to the terminal according to the multiple sets of search space configuration parameter. After receiving the parameter configuration information, the terminal may store the multiple sets of search space configuration parameter included in the parameter configuration information. Then the base station obtains an initial search space configuration parameter from the multiple sets of search space configuration parameter according to an initial state of the terminal, then generates an initial monitoring instruction according to a parameter identifier of the initial search space configuration parameter, and sends the initial monitoring instruction to the terminal. The terminal may obtain the initial search space configuration parameter from the multiple sets of search space configuration parameter according to the parameter identifier included in the initial monitoring instruction, and then use the initial search space configuration parameter to monitor the search space, that is, the terminal may start normal operation. During the normal operation of the terminal, the current state may be obtained in real time, and it may be determined whether the current state satisfies the preset condition. If the current state satisfies the preset condition, the terminal may obtain the search space configuration parameter corresponding to the current state from the pre-stored multiple sets of search space configuration parameter, and switch the search space configuration parameter for currently monitoring the search space to the search space configuration parameter corresponding to the current state, thereby using the search space configuration parameter corresponding to the current state to continue monitoring the search space to obtain the downlink control information (DCI) sent by the base station through the PDCCH.

For example, the current state of the terminal may be a current state of receiving information of the terminal, or a current working state of the terminal. The current state of the terminal being the current state of receiving information is taken as an example. When the terminal uses the current search space configuration parameter to monitor the search space, the base station may obtain the working state of the terminal in real time, which includes at least one of a current service type, a service load, channel quality, a transmission/scheduling mode, and a PDCCH detection condition, and then determine whether the working state satisfies a second preset state, and determine the search space configuration parameter corresponding to the current working state of the terminal from the multiple sets of search space configuration parameter when it is determined that the working state satisfies the second preset state, and sends a switching instruction to the terminal according to the search space configuration parameter corresponding to the working state, and the switching instruction includes the parameter identifier of the search space configuration parameter corresponding to the working state of the terminal. The terminal may determine whether the switching instruction is received in real time. If it is determined that the switching instruction is received, it is confirmed that the current state has satisfied the preset condition. At this time, the terminal may obtain the search space configuration parameter corresponding to the parameter identifier included in the switching instruction from the pre-stored multiple sets of search space configuration parameter. Then the terminal may switch the search space configuration parameter for currently monitoring the search space to the search space configuration parameter corresponding to the current state, and use the search space configuration parameter corresponding to the current state to continue monitoring the search space to obtain the downlink control information (DCI) sent by the base station through the PDCCH.

Specifically, after determining the search space configuration parameter corresponding to the current working state of the terminal, the base station may first obtain the parameter identifier of the search space configuration parameter corresponding to the working state, and then write the parameter identifier into the target field of the preset DCI, and send the preset DCI to the terminal through the PDCCH. The terminal may receive the preset DCI sent by the base station through the PDCCH by detecting the PDCCH, and then obtain information of the target field of the preset DCI, and determine whether there is a parameter identifier that matches the information of the target field of the preset DCI among a plurality of parameter identifiers corresponding to the multiple sets of search space configuration parameter, respectively, that is, determining whether there is a search space configuration parameter of which the parameter identifier is the information of the target field of the preset DCI among the multiple sets of search space configuration parameter. If there is the parameter identifier that matches the information of the target field of the preset DCI among the plurality of parameter identifiers, that is, there is the search space configuration parameter of which the parameter identifier is the information of the target field of the preset DCI among the multiple sets of search space configuration parameter, it is confirmed that the switching instruction sent by the base station is received.

Alternatively, after determining the search space configuration parameter corresponding to the current working state of the terminal, the base station may first obtain the parameter identifier of the search space configuration parameter corresponding to the working state, and then send the parameter identifier to the terminal through the target control channel. The terminal may listen to the target control channel in real time and obtain the information transmitted by the target control channel, and then determine whether there is a parameter identifier that matches the information transmitted by the target control channel among a plurality of parameter identifiers corresponding to the multiple sets of search space configuration parameter, respectively, that is, determining whether there is a search space configuration parameter of which the parameter identifier is the information transmitted by the target control channel among the multiple sets of search space configuration parameter. If there is the parameter identifier that matches the information transmitted by the target control channel among the plurality of parameter identifiers, that is, there is the search space configuration parameter of which the parameter identifier is the information transmitted by the target control channel among the multiple sets of search space configuration parameter, it is confirmed that the switching instruction sent by the base station is received.

Alternatively, after determining the search space configuration parameter corresponding to the current working state of the terminal, the base station may first obtain the parameter identifier of the search space configuration parameter corresponding to the working state, and then write the parameter identifier into the target field of the preset MAC layer information, and send the preset MAC layer information to the terminal. After receiving the preset MAC layer information sent by the base station, the terminal obtains information of the target field of the preset MAC layer information, and determine whether there is a parameter identifier that matches the information of the target field of the preset MAC layer information among a plurality of parameter identifiers corresponding to the multiple sets of search space configuration parameter, respectively, that is, determining whether there is a search space configuration parameter of which the parameter identifier is the information of the target field of the preset MAC layer information among the multiple sets of search space configuration parameter. If there is the parameter identifier that matches the information of the target field of the preset MAC layer information among the plurality of parameter identifiers, that is, there is the search space configuration parameter of which the parameter identifier is the information of the target field of the preset MAC layer information among the multiple sets of search space configuration parameter, it is confirmed that the switching instruction sent by the base station is received.

Taking the current state of the terminal as the current working state as an example, the base station and the terminal may agree on a first preset state in advance. When using the current search space configuration parameter to monitor the search space, the terminal may obtain the current working state in real time, and then determine whether the current working state satisfies the first preset state. If the current working state satisfies the first preset state, it is confirmed the current state has satisfied the preset condition, and then the terminal obtains the search space configuration parameter corresponding to the current working state from the pre-stored multiple sets of search space configuration parameter. After that, the terminal may switch the search space configuration parameter for currently monitoring the search space to the search space configuration parameter corresponding to the current state, and use the search space configuration parameter corresponding to the current state to continue monitoring the search space to obtain the downlink control information (DCI) sent by the base station through the PDCCH. At the same time, the base station may also obtain the current working state of the terminal, and when it is determined that the working state of the terminal satisfies the first preset state, the base station obtains the search space configuration parameter corresponding to the current working state of the terminal from the multiple sets of search space configuration parameter, and switch the currently used search space configuration parameter when the DCI is sent to the terminal through the PDCCH to the search space configuration parameter corresponding to the current working state of the terminal. Through the first preset state agreed by the terminal and the base station in advance, a solution in which the base station and the terminal switch the parameters synchronously is realized, which further improves the efficiency of the terminal in adjusting the search space configuration parameters, and reduces the power consumption of the terminal.

For example, the first preset state agreed by the base station and the terminal may be "a current service type of the terminal is a scheduling-sparse service". Assuming that the two sets of search space configuration parameter configured by the base station for the terminal are the first set of search space configuration parameter and the second set of search space configuration parameter, respectively, and the terminal currently uses the first set of search space configuration parameter to monitor the search space, the base station also uses the first set of search space configuration parameter to configure the search space at this time. During a normal working process, the terminal may obtain the current service type in real time, and determine whether the current service type is the scheduling-sparse service. If the current service type is the scheduling-sparse service, it is confirmed that the current working state of the terminal satisfies the first preset state. At this time, the terminal may use the currently stored second set of search space configuration parameter of which the search period is longer, the number of time units for continuous search in each search period is smaller, and the monitoring occasions in the time unit are fewer as the search space configuration parameter corresponding to the current working state of the terminal, and switch the first set of search space configuration parameter for currently monitoring the search space to the second set of search space configuration parameter, that is, the second set of search space configuration parameter is used to continue monitoring the search space. At the same time, the base station may also determine that the current service type of the terminal is the scheduling-sparse service, that is, the current working state of the terminal satisfies the first preset state, the base station may obtain the second set of search space configuration parameter as the search space configuration parameter corresponding to the current working state of the terminal, and uses the second set of search space configuration parameter to reconfigure the search space, and sends the DCI to the terminal through a PDCCH of the reconfigured search space, which realizes the solution in which the base station and the terminal switch the parameters synchronously.

Alternatively, the first preset state agreed by the base station and the terminal may also be "a current service type of the terminal is a scheduling-dense service". Assuming that the two sets of search space configuration parameter configured by the base station for the terminal are the first set of search space configuration parameter and the second set of search space configuration parameter, respectively, and the terminal currently uses the second set of search space configuration parameter to monitor the search space, the base station also uses the second set of search space configuration parameter to configure the search space at this time. During a normal working process, the terminal may obtain the current service type in real time, and determine whether the current service type is the scheduling-dense service. If the current service type is the scheduling-dense service, it is confirmed that the current working state of the terminal satisfies the first preset state. At this time, the terminal may use the currently stored first set of search space configuration parameter of which the search period is shorter, the number of time units for continuous search in each search period is larger, and the monitoring occasions in the time unit are more as the search space configuration parameter corresponding to the current working state of the terminal, and switch the second set of search space configuration parameter for currently monitoring the search space to the first set of search space configuration parameter, that is, the first set of search space configuration parameter is used to continue monitoring the search space. At the same time, the base station may also determine that the current service type of the terminal is the scheduling-dense service, that is, the current working state of the terminal satisfies the first preset state, the base station may obtain the first set of search space configuration parameter as the search space configuration parameter corresponding to the current working state of the terminal, and uses the first set of search space configuration parameter to reconfigure the search space, and sends the DCI to the terminal through a PDCCH of the reconfigured search space, which realizes the solution in which the base station and the terminal switch the parameters synchronously.

For example, the first preset state agreed by the base station and the terminal may be "the current channel quality of the terminal is greater than or equal to the first preset threshold". Assuming that the two sets of search space configuration parameter configured by the base station for the terminal are the first set of search space configuration parameter and the second set of search space configuration parameter, respectively, and the search space configuration parameter for currently monitoring the search space by the terminal is the second set of search space configuration parameter, that is, the base station currently uses the second set of search space configuration parameter to configure the search space at this time. When the terminal is monitoring the search space, it may obtain the channel quality and report it to the base station in real time. After obtaining the channel quality, the terminal may determine whether the channel quality is greater than or equal to the first preset threshold. If the channel quality is greater than or equal to the first preset threshold, it is confirmed that the current working state of the terminal satisfies the first preset state. At this time, the channel quality is good, and the terminal may obtain the currently stored first set of search space configuration parameter of which the CCE aggregation degrees in each monitoring occasion are smaller as the search space configuration parameter corresponding to the current working state, and switch the second set of search space configuration parameter for currently monitoring the search space to the first set of search space configuration parameter, that is, the first set of search space configuration parameter is used to continue monitoring the search space. At the same time, the base station may also determine that the current channel quality of the terminal is greater than or equal to the first preset threshold according to the channel quality reported by the terminal, that is, the current working state of the terminal satisfies the first preset state, the base station may obtain the first set of search space configuration parameter as the search space configuration parameter corresponding to the current working state of the terminal, and uses the first set of search space configuration parameter to reconfigure the search space, and sends the DCI to the terminal through a PDCCH of the reconfigured search space, which realizes the solution in which the base station and the terminal switch the parameters synchronously.

Alternatively, the first preset state agreed by the base station and the terminal may also be "the current channel quality of the terminal is less than or equal to a second preset threshold", where the second preset threshold is less than the first preset threshold. Assuming that the search space configuration parameter for currently monitoring the search space by the terminal is the first set of search space configuration parameter, that is, the base station currently uses the first set of search space configuration parameter to configure the search space at this time. After obtaining the channel quality, the terminal may determine whether the channel quality is less than or equal to the second preset threshold. If the channel quality is less than or equal to the second preset threshold, it is confirmed that the current working state of the terminal satisfies the first preset state. At this time, the channel quality is poor, and the terminal may obtain the currently stored second set of search space configuration parameter of which the CCE aggregation degrees in each monitoring occasion are greater as the search space configuration parameter corresponding to the current working state, and switch the first set of search space configuration parameter for currently monitoring the search space to the second set of search space configuration parameter, that is, the second set of search space configuration parameter is used to continue monitoring the search space. At the same time, the base station may also determine that the current channel quality of the terminal is less than or equal to the second preset threshold according to the channel quality reported by the terminal, that is, the current working state of the terminal satisfies the first preset state, the base station may obtain the second set of search space configuration parameter as the search space configuration parameter corresponding to the current working state of the terminal, and uses the second set of search space configuration parameter to reconfigure the search space, and sends the DCI to the terminal through a PDCCH of the reconfigured search space, which realizes the solution in which the base station and the terminal switch the parameters synchronously.

Alternatively, the terminal and the base station may also agree on the first preset state according to a PDCCH detection condition. The PDCCH detection condition may be a number of times, time or period of continuous transmission/detection of PDCCH, or a number of times, time or period of continuous non-transmission/non-detection of PDCCH. Assuming that the first preset state agreed by the terminal and the base station is "the number of times of continuous non-transmission/non-detection of PDCCH is greater than or equal to a preset threshold of number of times". The two sets of search space configuration parameter configured by the base station for the terminal are the first set of search space configuration parameter and the second set of search space configuration parameter, respectively, and the terminal currently uses the first set of search space configuration parameter to monitor the search space, and the base station also uses the first set of search space configuration parameter to configure the search space at this time. The terminal may record the number of times of continuous non-detection of PDCCH in real time, and then determine whether the number of times is greater than or equal to the preset threshold of number of times. If the number of times is greater than or equal to the preset threshold of number of times, it indicates that the scheduling-sparse service is currently running, and it is confirmed that the current working state satisfies the first preset state at this time, and the second set of search space configuration parameter of which the search period is longer, the number of time units for continuous search in each search period is smaller, and the monitoring occasions in the time unit are fewer is obtained and determined as the search space configuration parameter corresponding to the current working state, and the first set of search space configuration parameter for currently monitoring the search space is switched to the second set of search space configuration parameter, that is, the second set of search space configuration parameter is used to continue monitoring the search space. At the same time, the base station may also record the number of times of continuous non-transmission of PDCCH in real time, and then determine whether the number of times is greater than or equal to the preset threshold of number of times. If the number of times is greater than or equal to the preset threshold of number of times, it is confirmed that the current working state of the terminal satisfies the first preset state at this time. At this time, the base station may obtain the second set of search space configuration parameter as the search space configuration parameter corresponding to the current working state of the terminal, and uses the second set of search space configuration parameter to reconfigure the search space, and sends the DCI to the terminal through a PDCCH of the reconfigured search space, which realizes the solution in which the base station and the terminal switch the parameters synchronously. Optionally, the first preset state agreed by the base station and the terminal may also be "the number of times of continuous transmission/detection of PDCCH is greater than or equal to the preset threshold of number of times", "a time of continuous transmission/detection of PDCCH is greater than or equal to a preset time threshold", "a period of continuous transmission/detection of PDCCH is greater than or equal to a preset period threshold", "a time of continuous non-transmission/non-detection of PDCCH is greater than or equal to the preset time threshold", or "a period of continuous non-transmission/non-detection of PDCCH is greater than or equal to the preset period threshold", etc., which is not limited in the embodiments of the present disclosure.

In the practical application, the terminal may also obtain the current service load and the current transmission/scheduling mode, and determine whether the current working state satisfies the first preset state according to the current service load and the current transmission/scheduling mode, and the corresponding determining process may refer to the above embodiments of the service type and the channel quality, which is not repeated here by the embodiments of the present disclosure.

Optionally, the correspondence between the state and the search space configuration parameter may be configured by the base station or preset according to rules. The correspondence between the state and the search space configuration parameter characterizes the multiple sets of search space configuration parameter configured by the base station for the terminal correspond to a plurality of different working states, respectively. For example, when the service type included in the working state is the scheduling-dense service, the corresponding search space configuration parameter includes a shorter search period, a larger number of time units for continuous search in each search period, and more monitoring occasions in the time unit; when the service type included in the working state is the scheduling-sparse service, the corresponding search space configuration parameter includes a longer search period, a smaller number of time units for continuous search in each search period, and fewer monitoring occasions in the time unit; when the service load included in the working state is larger, the corresponding search space configuration parameter includes fewer potential transmission positions of PDCCH; when the service load included in the working state is smaller, the corresponding search space configuration parameter includes more potential transmission positions of PDCCH; when the channel quality included in the working state is good, the corresponding search space configuration parameter includes a smaller CCE aggregation degree in each monitoring occasion; when the channel quality included in the working state is poor, the corresponding search space configuration parameter includes a greater CCE aggregation degree in each monitoring occasion; or the transmission/scheduling modes included in the working state are different, and the corresponding search space configuration parameters are also different. After obtaining the current working state of the terminal, the base station or the terminal may query the correspondence between the state and the search space configuration parameter, and obtain the search space configuration parameter corresponding to the current working state.

In the technical solutions provided by the embodiments of the present disclosure, when determining that the current state satisfies the preset condition, the terminal may obtain the search space configuration parameter needed for switching according to the current state, and perform the switching, avoiding time delay caused by adjustment of the search space configuration parameter through a high layer signaling sent by the base station, thereby realizing a solution in which the terminal adjusts the search space configuration parameter at an optimal occasion, and improving efficiency of the terminal to adjust the search space configuration parameter, and reducing power consumption of the terminal.

Figure 2B:
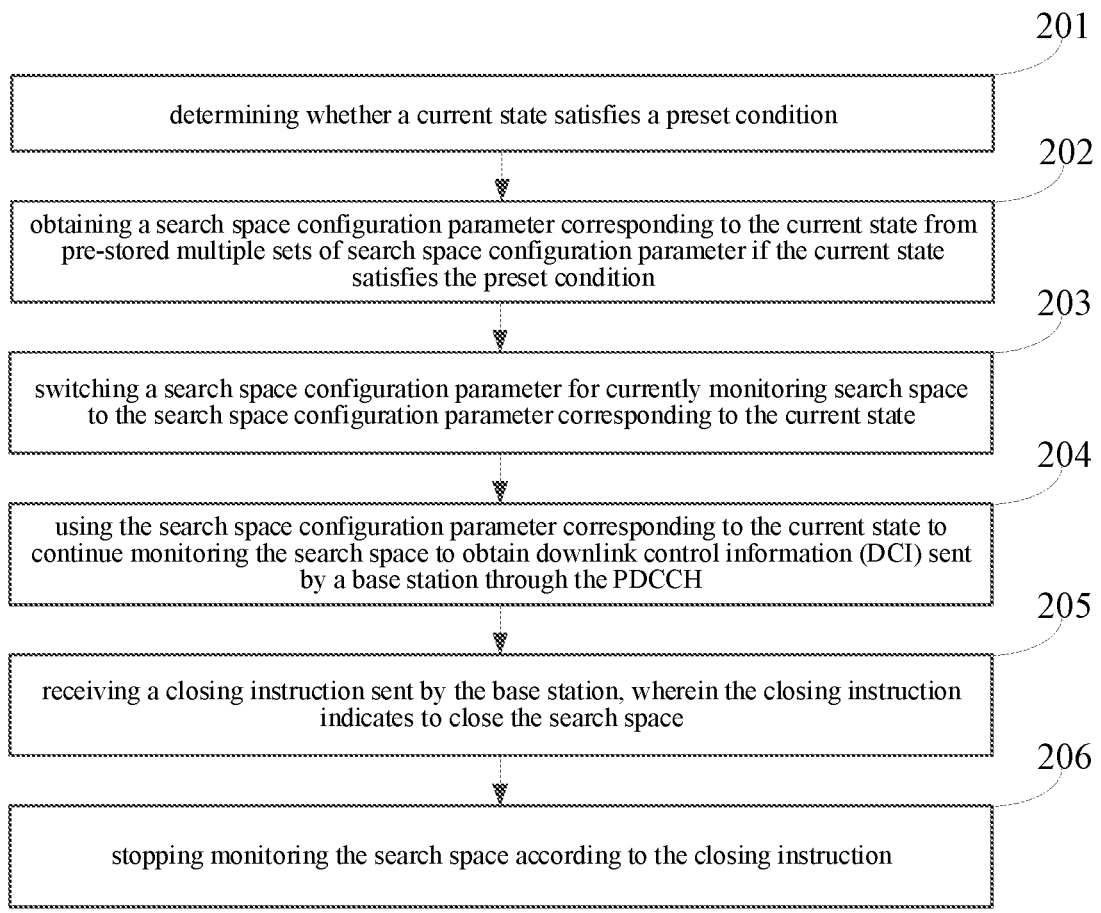
FIG. 2B is a flowchart showing a method for configuring and adjusting search space parameter according to an exemplary embodiment.

In an embodiment, as shown in FIG. 2B, the method further includes step 205 and step 206:

In the step 205, a closing instruction sent by the base station is received, and the closing instruction indicates to close the search space.

In the step 206, according to the closing instruction, monitoring the search space is stopped.

For example, the base station may obtain the current working state of the terminal in real time, and then determine whether to close the search space according to the current working state of the terminal. Optionally, the base station may obtain the current service type of the terminal, and then determine whether the service type is the scheduling-sparse service. If the service type is the scheduling-sparse service, it is confirmed that the search space may be closed. At this time, the base station may send the closing instruction to the terminal. After receiving the closing instruction, the terminal may stop monitoring the search space according to the closing instruction. Alternatively, the base station may obtain the current service load of the terminal, and then determine whether the service load is less than or equal to the preset load threshold. If the service load is less than or equal to the preset load threshold, it is confirmed that the search space may be closed. At this time, the base station may send the closing instruction to the terminal. After receiving the closing instruction, the terminal may stop monitoring the search space according to the closing instruction. In the practical application, the base station may also obtain the current channel quality, the transmission/scheduling mode, or the PDCCH detection condition of the terminal, and then determine whether to close the search space according to the current channel quality, the transmission/scheduling mode, or the PDCCH detection condition of the terminal, thereby determining whether to send the closing instruction to the terminal. Specific implementation manners may refer to the above embodiments of the service type and the service load.

Optionally, the base station may send the closing instruction to the terminal by a form of writing a preset closing character into a reference field of the preset DCI. For example, the base station and the terminal may agree in advance that if the preset closing character exists in the reference field of the preset DCI, it indicates that the closing instruction is received. Assuming that preset closing characters are 00, and when determining that the search space needs to be closed, the base station may write the characters 00 in the reference field of the preset DCI when sending the preset DCI to the terminal. The terminal may receive the preset DCI by monitoring the search space, and then reads that the characters in the reference field of the preset DCI are 00. At this time, the terminal confirms that it has received the closing instruction and stops monitoring the search space. The reference field may be any field different from the target field.

Alternatively, the base station may also send the closing instruction to the terminal through a reference control channel. For example, the base station and the terminal may agree in advance that if a non-zero character exists in the reference control channel, it indicates that the closing instruction is received. The terminal may listen to the reference control channel. If the non-zero character exists in the reference control channel, it is confirmed that the closing instruction is received, and the terminal stops monitoring the search space at this time.

Optionally, the base station may notify the terminal of the listening parameter of the reference control channel through broadcast information, and the terminal may listen to the reference control channel according to the listening parameter in real time; or, the base station may also add the listening parameter of the reference control channel to the parameter configuration information when sending the parameter configuration information to the terminal, and then send it to the terminal; or the base station may also send the listening parameter of the reference control channel to the terminal through another RRC signaling, which is not limited in the embodiments of the present disclosure.

In the technical solutions provided by the embodiments of the present disclosure, the terminal may stop monitoring the search space according to the instruction of the base station, which further reduces the power consumption of the terminal.

In the following, a specific embodiment is used to illustrate the technical solution in this embodiment.

First Specific Embodiment

Figure 3:
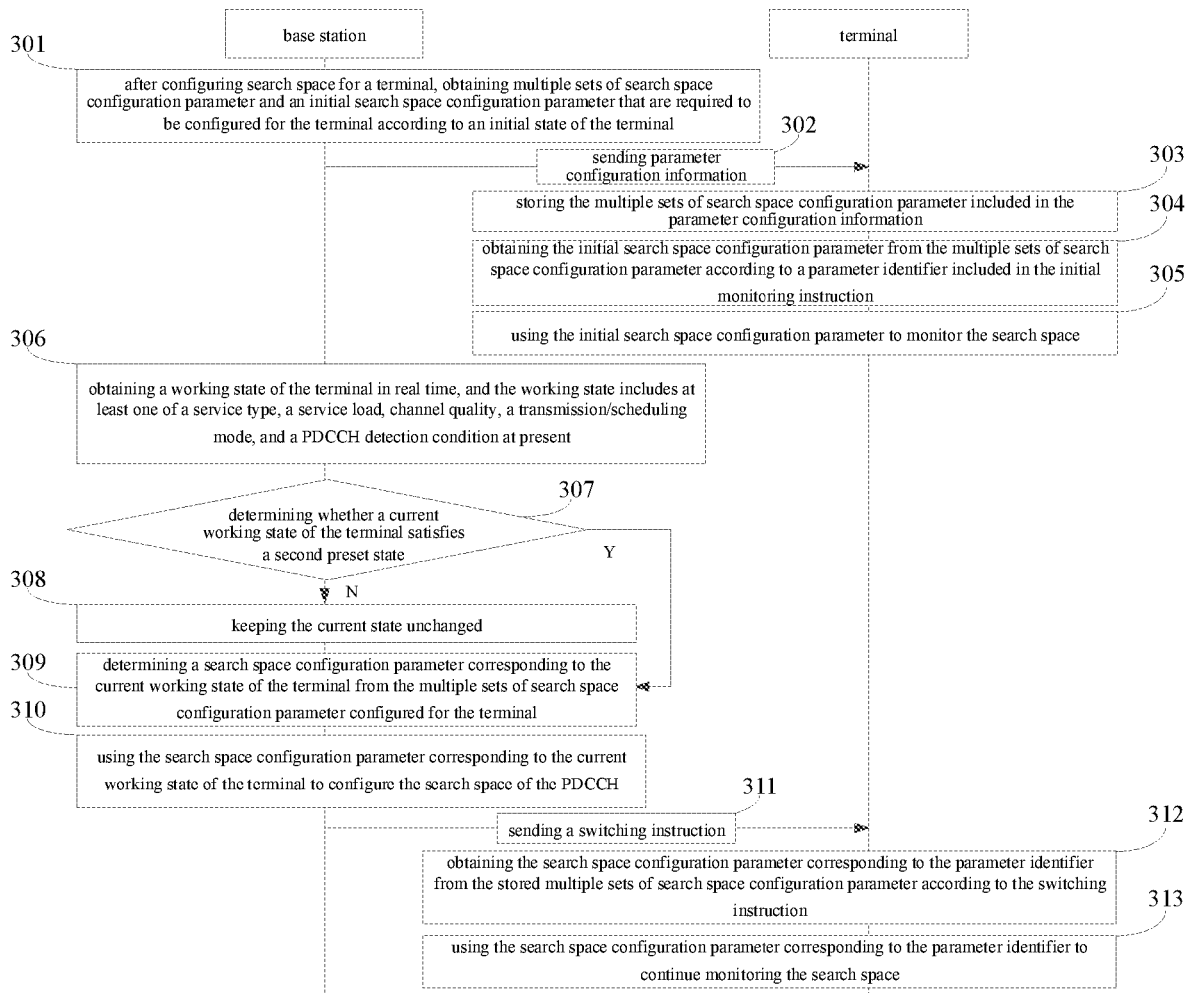
FIG. 3 is an interaction diagram showing a method for configuring and adjusting search space parameter according to an exemplary embodiment.

FIG. 3 is an interaction diagram showing a method for configuring and adjusting search space parameter according to an exemplary embodiment. The method for configuring and adjusting search space parameter is applied to a terminal and a base station. As shown in FIG. 3, it includes the following steps 301 to 313:

In the step 301, after configuring the search space for the terminal, the base station obtains the multiple sets of search space configuration parameter and the initial search space configuration parameter that are required to be configured for the terminal according to the initial state of the terminal.

The search space configuration parameter includes at least one of a search period, a number of time units for continuous search in each search period, a monitoring occasion in the time unit, a CCE aggregation degree in each monitoring occasion, a potential transmission position of a PDCCH under each CCE aggregation degree, and the DCI format, and the initial search space configuration parameter is a search space configuration parameter required to initially monitor the search space by the terminal.

In the step 302, the base station sends the parameter configuration information to the terminal. The parameter configuration information includes the multiple sets of search space configuration parameter and the initial monitoring instruction.

The initial monitoring instruction includes a parameter identifier of the initial search space configuration parameter.

In the step 303, the terminal stores the multiple sets of search space configuration parameter included in the parameter configuration information.

In the step 304, the terminal obtains the initial search space configuration parameter from the multiple sets of search space configuration parameter according to the parameter identifier included in the initial monitoring instruction.

In the step 305, the terminal uses the initial search space configuration parameter to monitor the search space.

In the step 306, the base station obtains the working state of the terminal in real time, and the working state includes at least one of a current service type, a service load, channel quality, a transmission/scheduling mode, and a PDCCH detection condition.

In the step 307, the base station determines whether the current working state of the terminal satisfies the second preset state; if not, the step 308 is executed; if so, execute the step 309 is executed.

In the step 308, the base station keeps the current state unchanged.

In this case, the base station continues to use the current search space configuration parameter to configure the search space of the PDCCH, and at the same time, the terminal continues to use the current search space configuration parameter to monitor the search space.

In the step 309, the base station determines the search space configuration parameter corresponding to the current working state of the terminal from the multiple sets of search space configuration parameter configured for the terminal.

In the step 310, the base station uses the search space configuration parameter corresponding to the current working state of the terminal to configure the search space of the PDCCH.

In the step 311, the base station sends the switching instruction to the terminal.

The switching instruction includes the parameter identifier of the search space configuration parameter corresponding to the current working state of the terminal.

In the step 312, the terminal obtains the search space configuration parameter corresponding to the parameter identifier from the stored multiple sets of search space configuration parameter.

In the step 313, the terminal uses the search space configuration parameter corresponding to the parameter identifier to continue monitoring the search space.

The embodiments of the present disclosure provide the method for configuring and adjusting search space parameter, the base station may configure the multiple sets of search space configuration parameter for the terminal during initialization, so that when determining that the current state satisfies the preset condition, the terminal may obtain the search space configuration parameter needed for switching according to the current state, and perform the switching, avoiding time delay caused by adjustment of the search space configuration parameter through a high layer signaling sent by the base station, thereby realizing a solution in which the terminal adjusts the search space configuration parameter at an optimal occasion, and improving efficiency of the terminal to adjust the search space configuration parameter, and reducing power consumption of the terminal.

Second Specific Embodiment

Figure 4:
FIG. 4 is an interaction diagram showing a method for configuring and adjusting search space parameter according to an exemplary embodiment.

FIG. 4 is an interaction diagram showing a method for configuring and adjusting search space parameter according to an exemplary embodiment. The method for configuring and adjusting search space parameter is applied to a terminal and a base station. As shown in FIG. 4, it includes the following steps 401 to 420:

In the step 401, after configuring the search space for the terminal, the base station obtains the multiple sets of search space configuration parameter and the initial search space configuration parameter that are required to be configured for the terminal according to the initial state of the terminal.

Each set of search space configuration parameter includes at least one of a search period for monitoring the search space, a number of time units for continuous search in each search period, a monitoring occasion in the time unit, a CCE aggregation degree in each monitoring occasion, a potential transmission position of a PDCCH under each CCE aggregation degree, and the DCI format.

In the step 402, the base station sends the parameter configuration information to the terminal, and the parameter configuration information includes the multiple sets of search space configuration parameter.

In the step 403, the terminal stores the multiple sets of search space configuration parameter included in the parameter configuration information.

In the step 404, the base station obtains the initial search space configuration parameter when the terminal initially monitors the search space from the multiple sets of search space configuration parameter.

In the step 405, the base station sends the initial monitoring instruction to the terminal according to the initial search space configuration parameter.

The initial monitoring instruction includes a parameter identifier of the initial search space configuration parameter.

In the step 406, the terminal obtains the initial search space configuration parameter from the multiple sets of search space configuration parameter according to the initial monitoring instruction.

In the step 407, the terminal uses the initial search space configuration parameter to monitor the search space.

In the step 408, the base station obtains the working state of the terminal in real time, and the working state includes at least one of a current service type, a service load, channel quality, a transmission/scheduling mode, and a PDCCH detection condition.

In the step 409, the base station determines whether to close the search space according to the working state of the terminal; if the search space is closed, the step 410 is executed; if the search space is not closed, the step 412 is executed.

In the step 410, the base station sends the closing instruction to the terminal.

In the step 411, the terminal stops monitoring the search space according to the closing instruction.

In the step 412, the base station determines whether the working state of the terminal satisfies the first preset state; if not, the step 413 is executed; if so, the step 414 is executed.

In the step 413, the base station keeps the current state unchanged.

In this case, the base station continues to use the current search space configuration parameter to configure the search space of the PDCCH, and at the same time, the terminal continues to use the current search space configuration parameter to monitor the search space.

In the step 414, the base station determines the search space configuration parameter corresponding to the current working state of the terminal from the multiple sets of search space configuration parameter.

In the step 415, the base station uses the search space configuration parameter corresponding to the current working state of the terminal to configure the search space of the PDCCH.

In the step 416, the terminal obtains the current working state in real time, and the working state includes at least one of a current service type, a service load, channel quality, a transmission/scheduling mode, and a PDCCH detection condition.

In the step 417, the terminal determines whether the current working state satisfies the first preset state; if not, the step 418 is executed; if so, the step 419 is executed.

In the step 418, the terminal keeps the current state unchanged.

In this case, the base station continues to use the current search space configuration parameter to configure the search space of the PDCCH, and at the same time, the terminal continues to use the current search space configuration parameter to monitor the search space.

In the step 419, the terminal determines the search space configuration parameter corresponding to the current working state from the configured multiple sets of search space configuration parameter.

In the step 420, the terminal uses the search space configuration parameter corresponding to the current working state to monitor the search space to obtain the DCI sent by the base station through the PDCCH.

The embodiments of the present disclosure provide the method for configuring and adjusting search space parameter, the base station may configure the multiple sets of search space configuration parameter for the terminal during initialization, so that when determining that the current state satisfies the preset condition, the terminal may obtain the search space configuration parameter needed for switching according to the current state, and perform the switching, avoiding time delay caused by adjustment of the search space configuration parameter through a high layer signaling sent by the base station, thereby realizing a solution in which the terminal adjusts the search space configuration parameter at an optimal occasion, and improving efficiency of the terminal to adjust the search space configuration parameter, and reducing power consumption of the terminal.

The following are device embodiments of the present disclosure, which may be configured to implement method embodiments of the present disclosure.

Figure 5A:
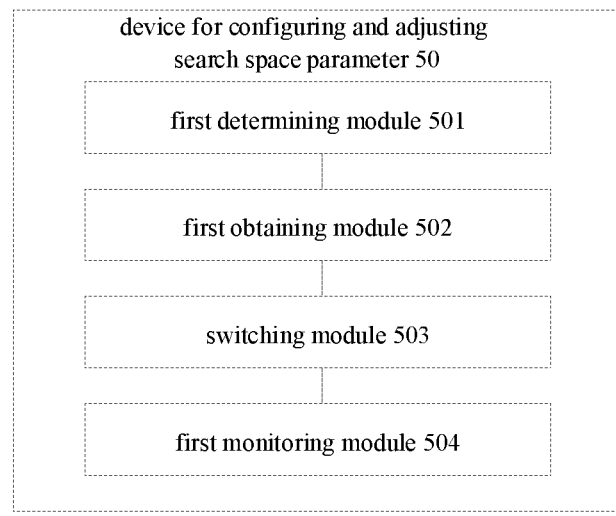
FIG. 5A is a schematic structural diagram showing a device for configuring and adjusting search space parameter according to an exemplary embodiment.

FIG. 5A is a schematic structural diagram showing a device 50 for configuring and adjusting search space parameter according to an exemplary embodiment. The device 50 may be implemented as a part or all of an electronic device through software, hardware, or a combination of thereof. As shown in FIG. 5A, the device 50 for configuring and adjusting search space parameter includes a first determining module 501, a first obtaining module 502, a switching module 503, and a first monitoring module 504.

The first determining module 501 is configured to determine whether a current state satisfies a preset condition;

The first obtaining module 502 is configured to obtain a search space configuration parameter corresponding to the current state from pre-stored multiple sets of search space configuration parameter if the current state satisfies the preset condition, wherein each set of search space configuration parameter includes at least one of a search period, a number of time units for continuous search in each search period, a monitoring occasion in the time unit, a control channel element (CCE) aggregation degree in each monitoring occasion, a potential transmission position of a physical downlink control channel (PDCCH) under each CCE aggregation degree, and a downlink control information format.

The switching module 503 is configured to switch a search space configuration parameter for currently monitoring search space to the search space configuration parameter corresponding to the current stat.

The first monitoring module 504 is configured to use the search space configuration parameter corresponding to the current state to continue monitoring the search space to obtain downlink control information (DCI) sent by a base station through the PDCCH.

Figure 5B:
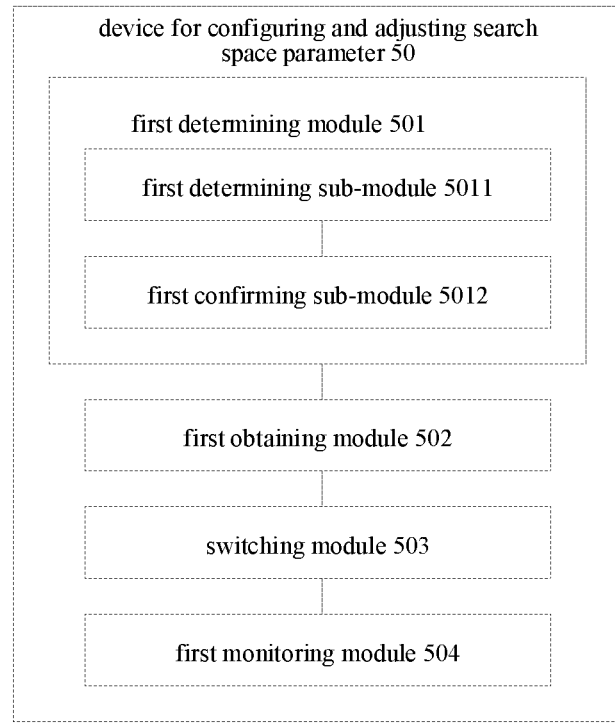
FIG. 5B is a schematic structural diagram showing a device for configuring and adjusting search space parameter according to an exemplary embodiment.

In an embodiment, as shown in FIG. 5B, the first determining module 501 includes a first determining sub-module 5011 and a first confirming sub-module 5012.

The first determining sub-module 5011 is configured to determine whether a switching instruction sent by the base station is currently received, wherein the switching instruction includes a parameter identifier of a search space configuration parameter to which the base station instructs the terminal to switch.

The first confirming sub-module 5012 is configured to confirm that the current state has satisfied the preset condition if it is determined that the switching instruction has been received.

Figure 5C:
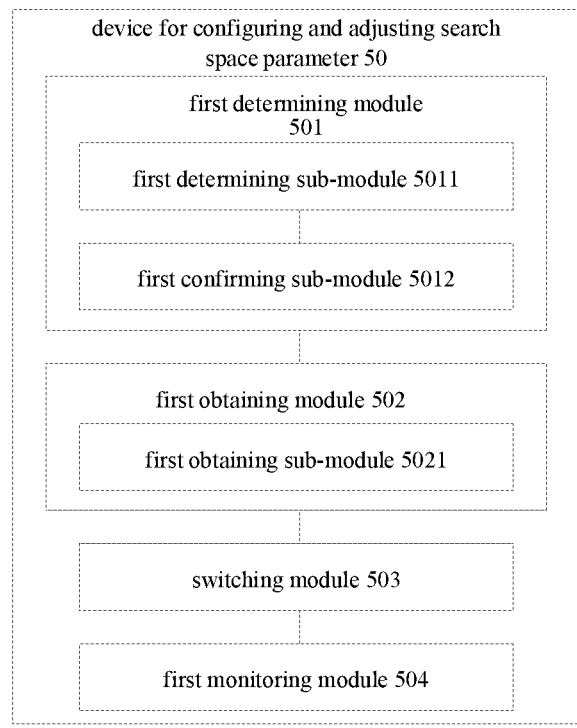
FIG. 5C is a schematic structural diagram showing a device for configuring and adjusting search space parameter according to an exemplary embodiment.

In an embodiment, as shown in FIG. 5C, the first obtaining module 502 includes a first obtaining sub-module 5021, and the first obtaining sub-module 5021 is configured to obtain a search space configuration parameter corresponding to the parameter identifier included in the switching instruction from the pre-stored multiple sets of search space configuration parameter as the search space configuration parameter corresponding to the current state.

Figure 5D:
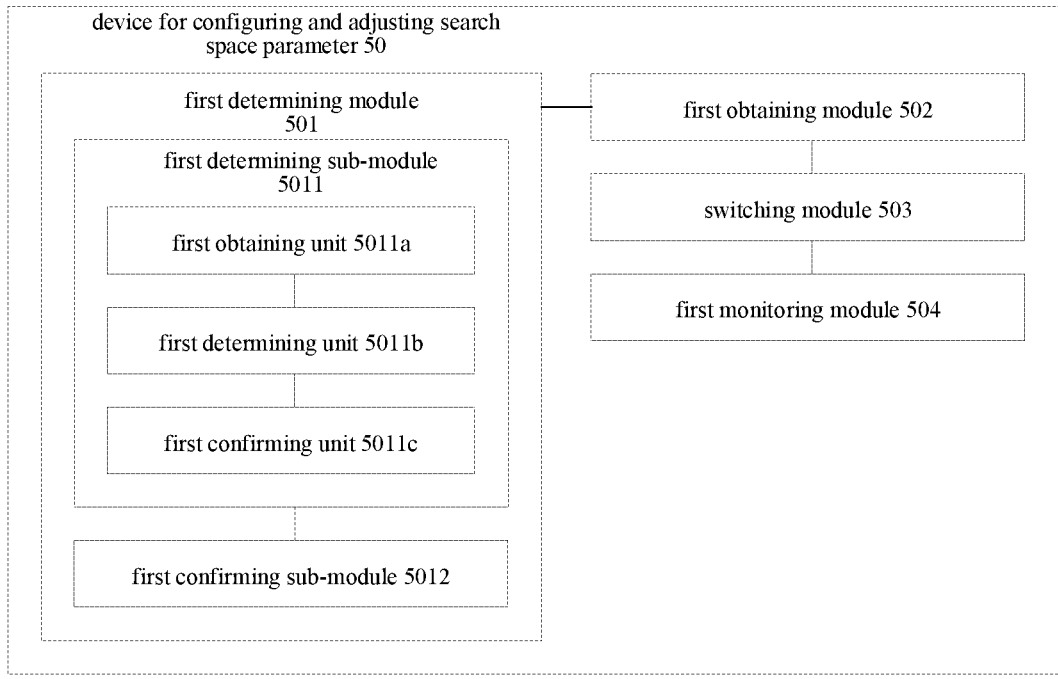
FIG. 5D is a schematic structural diagram showing a device for configuring and adjusting search space parameter according to an exemplary embodiment.

In an embodiment, as shown in FIG. 5D, the first determining sub-module 5011 includes a first obtaining unit 5011a, a first determining unit 5011b, and a first confirming unit 5011c.

The first obtaining unit 5011a is configured to obtain information of a target field of preset DCI sent by the base station through the PDCCH The first determining unit 5011b is configured to determine whether there is a parameter identifier that matches the information of the target field of the preset DCI among a plurality of parameter identifiers corresponding to the multiple sets of search space configuration parameter, respectively; and The first confirming unit 5011c is configured to confirm that the switching instruction sent by the base station is received if there is the parameter identifier that matches the information of the target field of the preset DCI among the plurality of parameter identifiers.

Figure 5E:
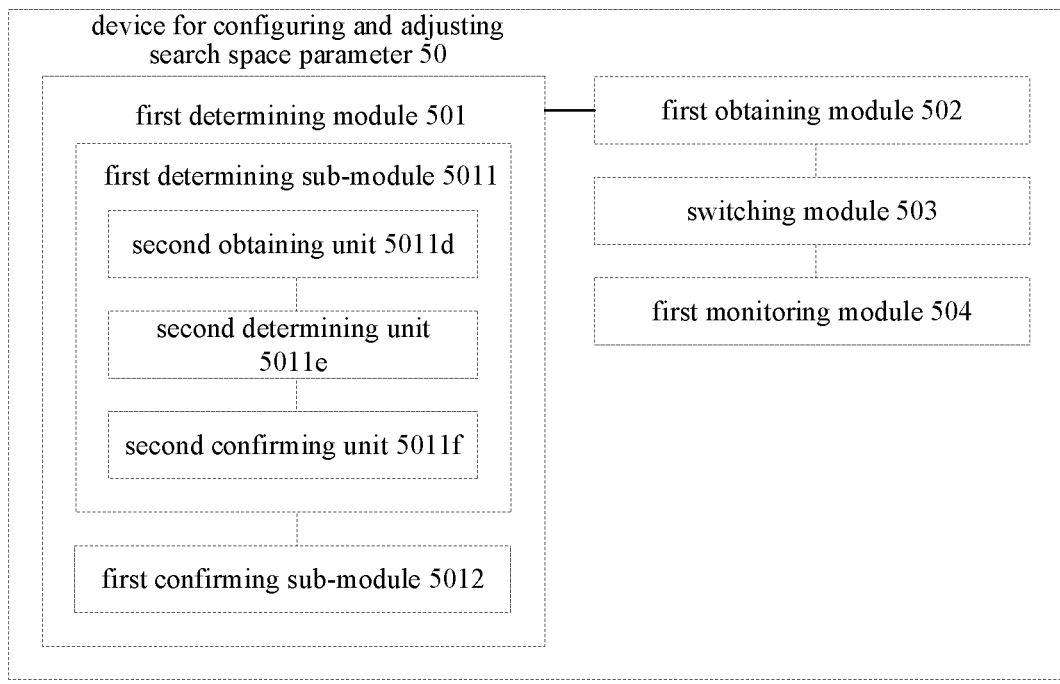
FIG. 5E is a schematic structural diagram showing a device for configuring and adjusting search space parameter according to an exemplary embodiment.

In an embodiment, as shown in FIG. 5E, the first determining sub-module 5011 includes a second obtaining unit 5011d, a second determining unit 5011e, and a second confirming unit 5011f.

The second obtaining unit 5011d is configured to obtain information transmitted by a target control channel in real time The second determining unit 5011e is configured to determine whether there is a parameter identifier that matches the information transmitted by the target control channel among a plurality of parameter identifiers corresponding to the multiple sets of search space configuration parameter, respectively; and The second confirming unit 5011f is configured to confirm that the switching instruction sent by the base station is received if there is the parameter identifier that matches the information transmitted by the target control channel among the plurality of parameter identifiers.

Figure 5F:
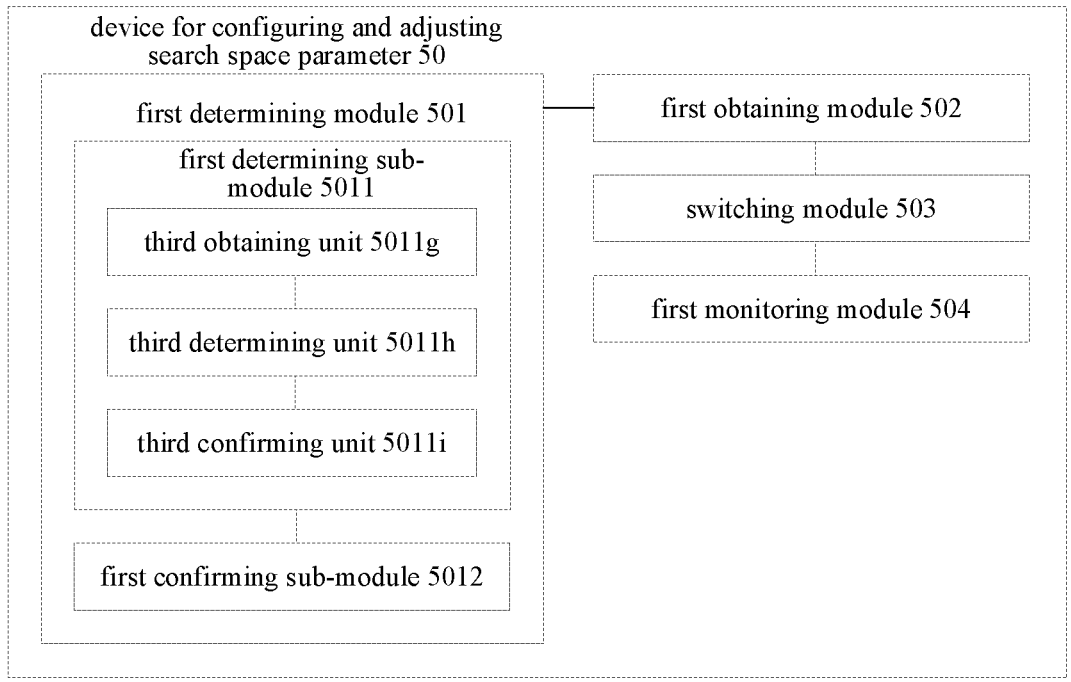
FIG. 5F is a schematic structural diagram showing a device for configuring and adjusting search space parameter according to an exemplary embodiment.

In an embodiment, as shown in FIG. 5F, the first determining sub-module 5011 includes a third obtaining unit 5011g, a third determining unit 5011h, and a third confirming unit 5011i.

The third obtaining unit 5011g is configured to obtain information of a target field of a preset media access control (MAC) layer message in real time.

The third determining unit 5011h is configured to determine whether there is a parameter identifier that matches the information of the target field of the preset MAC layer message among a plurality of parameter identifiers corresponding to the multiple sets of search space configuration parameter, respectively.

The third confirming unit 5011i is configured to confirm that the switching instruction sent by the base station is received if there is the parameter identifier that matches the information of the target field of the preset MAC layer message among the plurality of parameter identifiers.

Figure 5G:
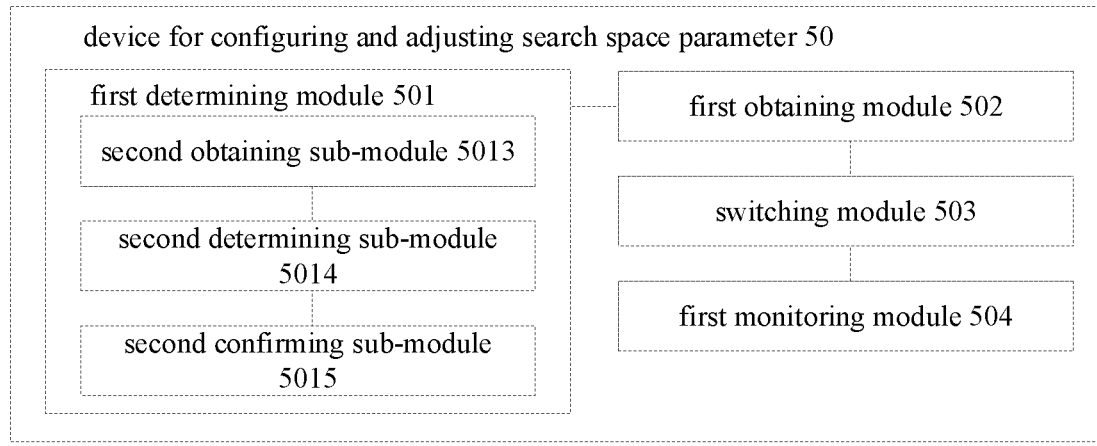
FIG. 5G is a schematic structural diagram showing a device for configuring and adjusting search space parameter according to an exemplary embodiment.

In an embodiment, as shown in FIG. 5G, the first determining module 501 includes a second obtaining sub-module 5013, a second determining sub-module 5014, and a second confirming sub-module 5015.

The second obtaining sub-module 5013 is configured to obtain a current working state, wherein the working state includes at least one of a current service type, a service load, channel quality, a transmission/scheduling mode, and a PDCCH detection condition.

The second determining sub-module 5014 is configured to determine whether the current working state satisfies a first preset state.

The second confirming sub-module 5015 is configured to confirm that the current state has satisfied the preset condition if the current working state satisfies the first preset state.

Figure 5H:
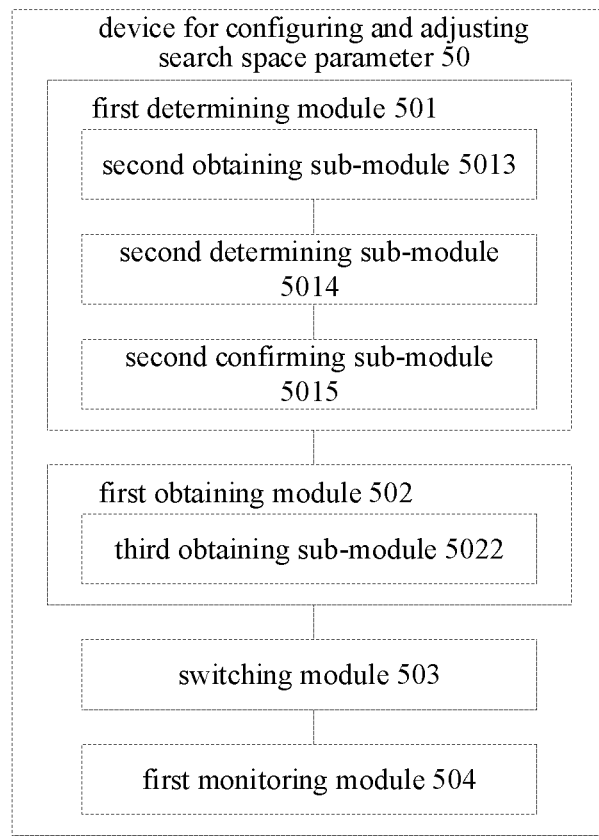
FIG. 5H is a schematic structural diagram showing a device for configuring and adjusting search space parameter according to an exemplary embodiment.

In an embodiment, as shown in FIG. 5H, the first obtaining module 502 includes a third obtaining sub-module 5022, and the third obtaining sub-module 5022 is configured to obtain the search space configuration parameter corresponding to the current state according to a correspondence between a preset state and a search space configuration parameter, wherein the correspondence between the state and the search space configuration parameter characterizes the multiple sets of search space configuration parameter correspond to a plurality of different working states, respectively.

Figure 5I:
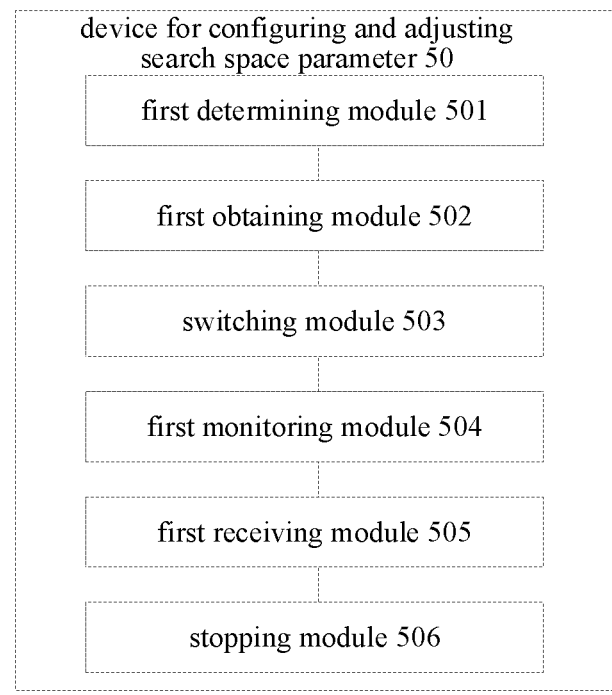
FIG. 5I is a schematic structural diagram showing a device for configuring and adjusting search space parameter according to an exemplary embodiment.

In an embodiment, as shown in FIG. 5I, the device 50 further includes a first receiving module 505 and a stopping module 506.

The first receiving module 505 is configured to receive a closing instruction sent by the base station, wherein the closing instruction indicates to close the search space.

The stopping module 506 is configured to stop monitoring the search space according to the closing instruction.

Figure 5J:
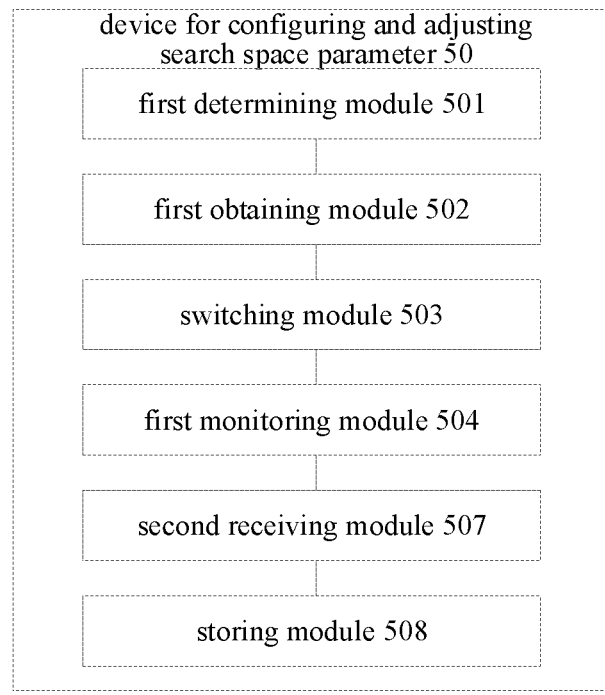
FIG. 5J is a schematic structural diagram showing a device for configuring and adjusting search space parameter according to an exemplary embodiment.

In an embodiment, as shown in FIG. 5J, the device 50 further includes a second receiving module 507 and a storing module 508.

The second receiving module 507 is configured to receive parameter configuration information sent by the base station, wherein the parameter configuration information includes the multiple sets of search space configuration parameter.

The storing module 508 is configured to store the multiple sets of search space configuration parameter included in the parameter configuration information.

Figure 5K:
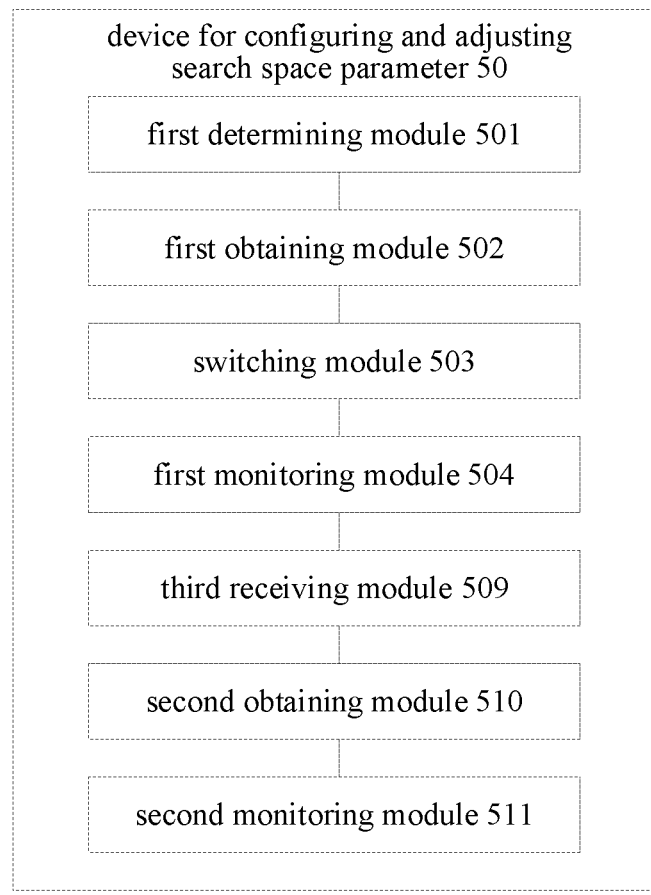
FIG. 5K is a schematic structural diagram showing a device for configuring and adjusting search space parameter according to an exemplary embodiment.

In an embodiment, as shown in FIG. 5K, the device 50 further includes a third receiving module 509, a second obtaining module 510, and a second monitoring module 511.

The third receiving module 509 is configured to receive an initial monitoring instruction sent by the base station, wherein the initial monitoring instruction includes a parameter identifier of a search space configuration parameter required by the terminal for initially monitoring the search space instructed by the base station.

The second obtaining module 510 is configured to obtain an initial search space configuration parameter from the multiple sets of search space configuration parameter according to the parameter identifier included in the initial monitoring instruction.

The second monitoring module 511 is configured to monitor the search space according to the initial search space configuration parameter.

The embodiments of the present disclosure provide the device for configuring and adjusting search space parameter, and when determining that the current state satisfies the preset condition, the device may obtain the search space configuration parameter needed for switching according to the current state, and perform the switching, avoiding time delay caused by adjustment of the search space configuration parameter through a high layer signaling sent by the base station, thereby realizing a solution in which the terminal adjusts the search space configuration parameter at an optimal occasion, and improving efficiency of the terminal to adjust the search space configuration parameter, and reducing power consumption of the terminal.

Figure 6A:
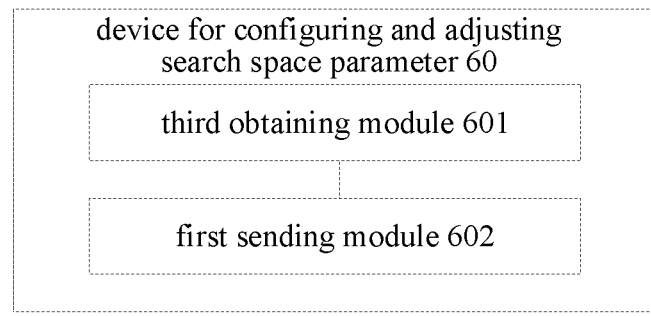
FIG. 6A is a schematic structural diagram showing a device for configuring and adjusting search space parameter according to an exemplary embodiment.

FIG. 6A is a schematic structural diagram showing a device 60 for configuring and adjusting search space parameter according to an exemplary embodiment. The device 60 may be implemented as a part or all of an electronic device through software, hardware, or a combination of thereof. As shown in FIG. 6A, the device 60 for configuring and adjusting search space parameter includes a third obtaining module 601 and a first sending module 602.

The third obtaining module 601 is configured to obtain multiple sets of search space configuration parameter corresponding to a plurality of different states of a terminal, respectively, wherein each set of search space configuration parameter includes at least one of a search period, a number of time units for continuous search in each search period, a monitoring occasion in the time unit, a control channel element (CCE) aggregation degree in each monitoring occasion, a potential transmission position of a physical downlink control channel (PDCCH) under each CCE aggregation degree, and a downlink control information format.

The first sending module 602 is configured to send parameter configuration information to the terminal, wherein the parameter configuration information includes the multiple sets of search space configuration parameter, so that the terminal selects a search space configuration parameter corresponding to its current state from the multiple sets of search space configuration parameter for switching.

Figure 6B:
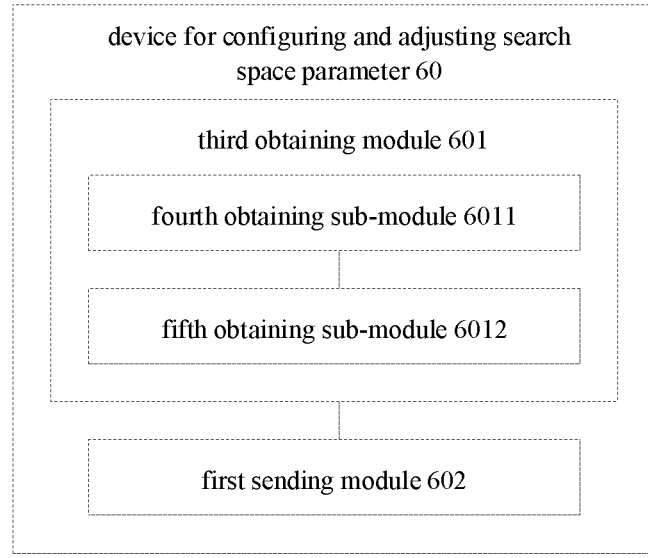
FIG. 6B is a schematic structural diagram showing a device for configuring and adjusting search space parameter according to an exemplary embodiment.

In an embodiment, as shown in FIG. 6B, the third obtaining module 601 includes a fourth obtaining sub-module 6011 and a fifth obtaining sub-module 6012.

The fourth obtaining sub-module 6011 is configured to obtain an initial state of the terminal, wherein the initial state includes at least one of an amount of data to be transmitted, a service type to be processed, or channel quality of the terminal.

The fifth obtaining sub-module 6012 is configured to obtain the multiple sets of search space configuration parameter according to the initial state of the terminal.

Figure 6C:
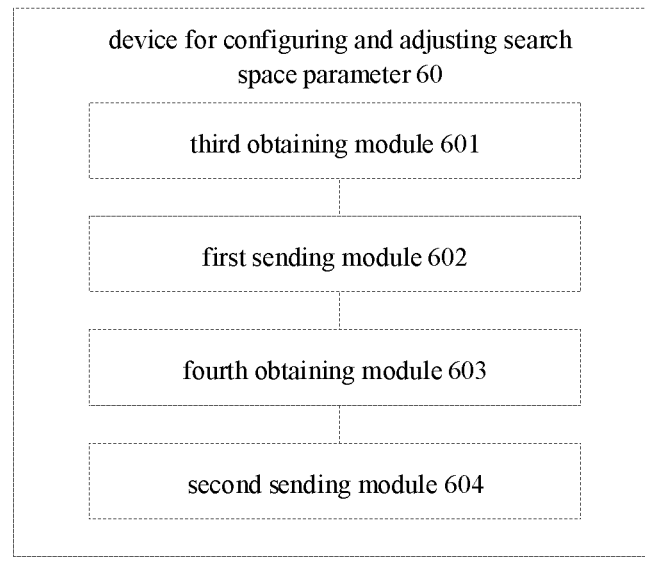
FIG. 6C is a schematic structural diagram showing a device for configuring and adjusting search space parameter according to an exemplary embodiment.

In an embodiment, as shown in FIG. 6C, the device 60 further includes a fourth obtaining module 603 and a second sending module 604.

The fourth obtaining module 603 is configured to obtain an initial search space configuration parameter required by the terminal for monitoring search space from the multiple sets of search space configuration parameter according to the initial state of the terminal.

The second sending module 604 is configured to send an initial monitoring instruction to the terminal according to the initial search space configuration parameter, wherein the initial monitoring instruction includes a parameter identifier of the initial search space configuration parameter.

Figure 6D:
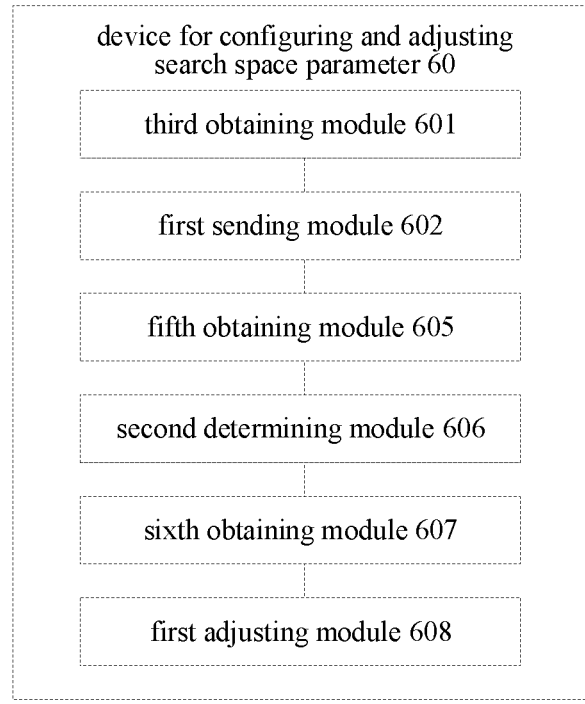
FIG. 6D is a schematic structural diagram showing a device for configuring and adjusting search space parameter according to an exemplary embodiment.

In an embodiment, as shown in FIG. 6D, the device 60 further includes a fifth obtaining module 605, a second determining module 606, a sixth obtaining module 607, and a first adjusting module 608.

The fifth obtaining module 605 is configured to obtain a current working state of the terminal, wherein the working state includes at least one of a service type, a service load, channel quality, a transmission/scheduling mode, and a PDCCH detection condition of the terminal at present The second determining module 606 is configured to determine whether the current working state of the terminal satisfies a first preset state.

The sixth obtaining module 607 is configured to obtain a search space configuration parameter corresponding to the current working state of the terminal from the multiple sets of search space configuration parameter if the current working state of the terminal satisfies the first preset state.

The first adjusting module 608 is configured to switch a search space configuration parameter for currently configuring the search space to the search space configuration parameter corresponding to the current working state of the terminal.

Figure 6E:
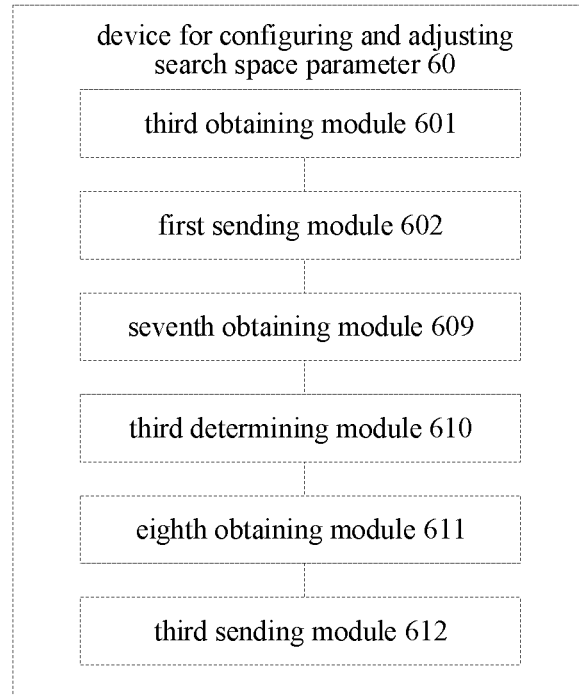
FIG. 6E is a schematic structural diagram showing a device for configuring and adjusting search space parameter according to an exemplary embodiment.

In an embodiment, as shown in FIG. 6E, the device 60 further includes a seventh obtaining module 609, a third determining module 610, an eighth obtaining module 611, and a third sending module 612.

The seventh obtaining module 609 is configured to obtain a current working state of the terminal, wherein the working state includes at least one of a service type, a service load, channel quality, a transmission/scheduling mode, and a PDCCH detection condition of the terminal at present.

The third determining module 610 is configured to determine whether the current working state of the terminal satisfies a second preset state.

The eighth obtaining module 611 is configured to determine a search space configuration parameter corresponding to the current working state of the terminal from the multiple sets of search space configuration parameter if the current working state of the terminal satisfies the second preset state.

The third sending module 612 is configured to send a switching instruction to the terminal according to the search space configuration parameter corresponding to the working state, wherein the switching instruction includes a parameter identifier of the search space configuration parameter corresponding to the current working state of the terminal.

Figure 6F:
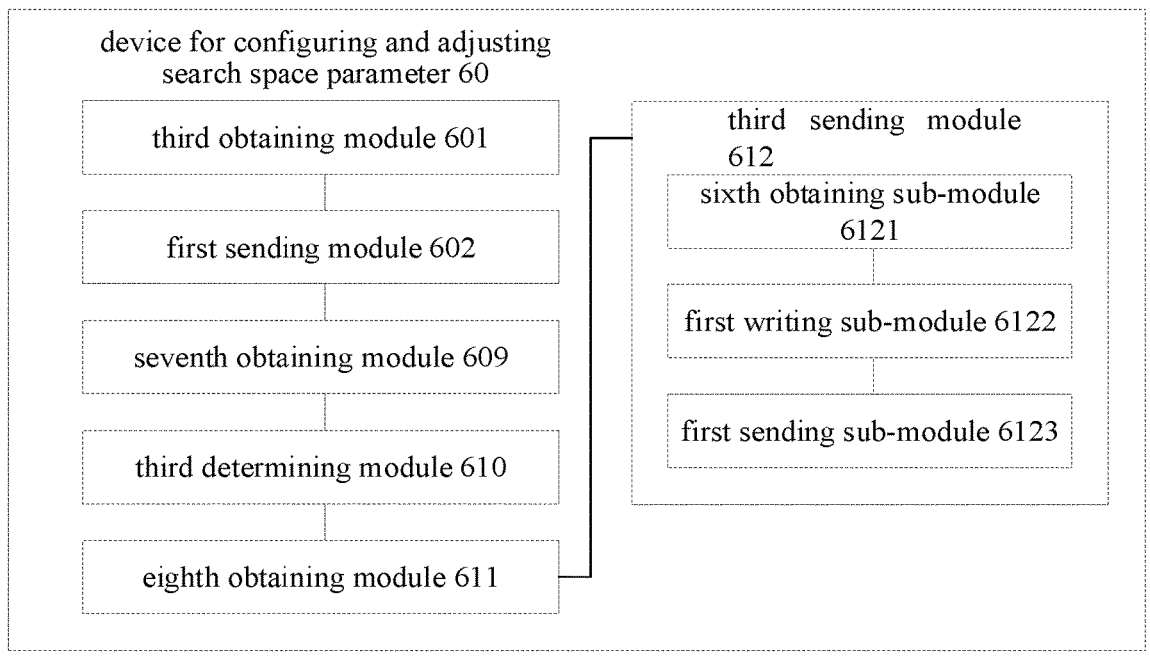
FIG. 6F is a schematic structural diagram showing a device for configuring and adjusting search space parameter according to an exemplary embodiment.

In an embodiment, as shown in FIG. 6F, the third sending module 612 includes a sixth obtaining sub-module 6121, a first writing sub-module 6122, and a first sending sub-module 6123.

The sixth obtaining sub-module 6121 is configured to obtain the parameter identifier of the search space configuration parameter corresponding to the working state.

The first writing sub-module 6122 is configured to write the parameter identifier into a target field of preset DCI.

The first sending sub-module 6123 is configured to send the preset DCI to the terminal through the PDCCH.

Figure 6G:
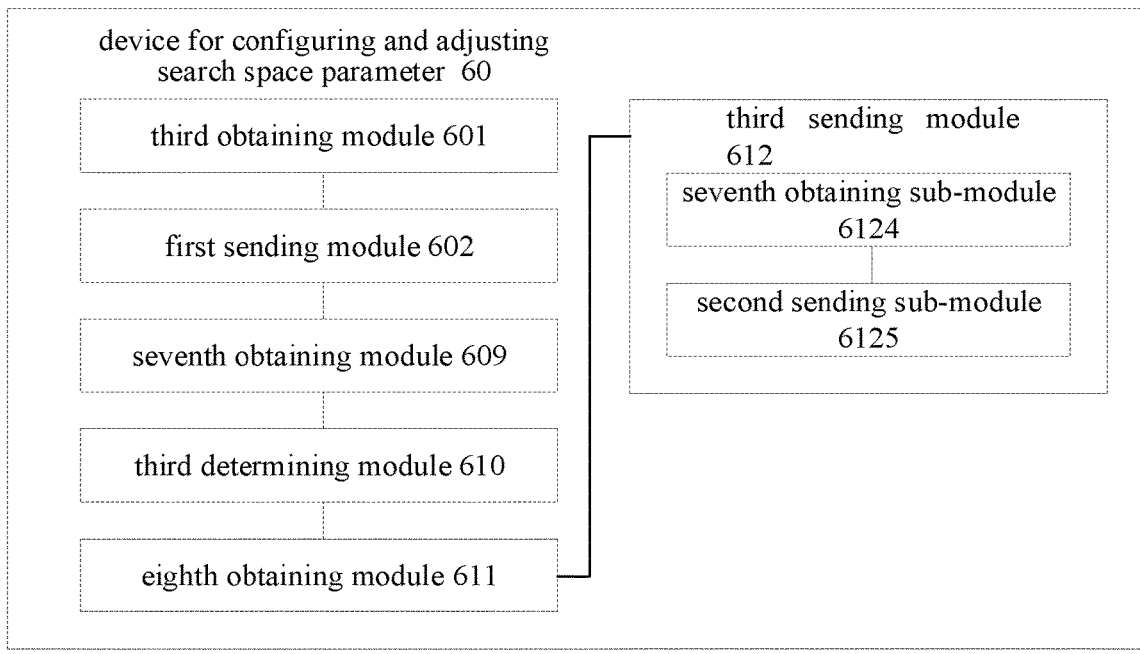
FIG. 6G is a schematic structural diagram showing a device for configuring and adjusting search space parameter according to an exemplary embodiment.

In an embodiment, as shown in FIG. 6G, the third sending module 612 includes a seventh obtaining sub-module 6124 and a second sending sub-module 6125.

The seventh obtaining sub-module 6124 is configured to obtain the parameter identifier of the search space configuration parameter corresponding to the working state.

The second sending sub-module 6125 is configured to send the parameter identifier to the terminal through a target control channel.

Figure 6H:
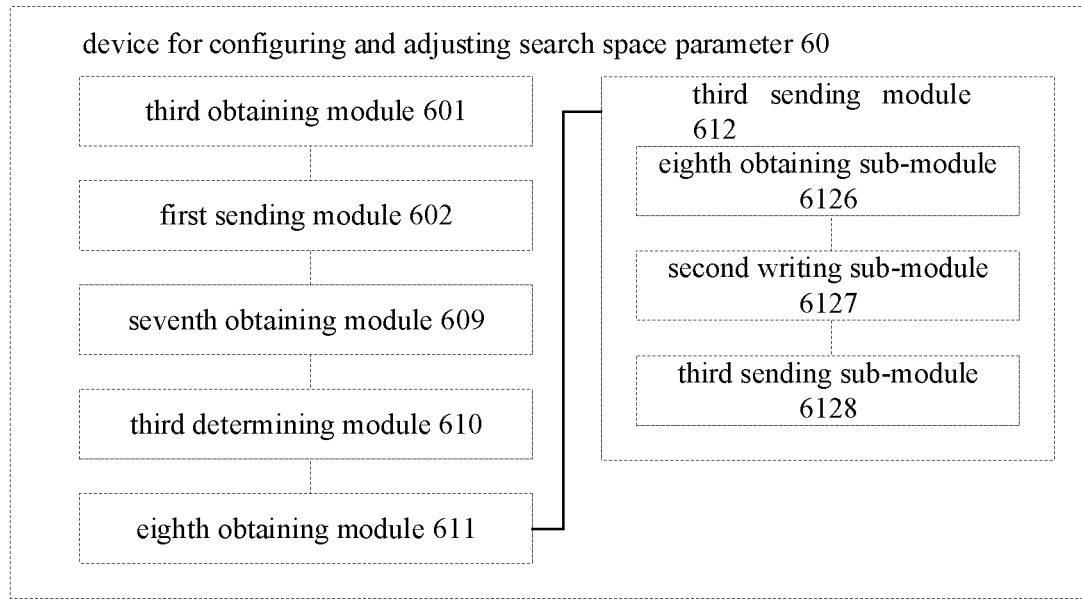
FIG. 6H is a schematic structural diagram showing a device for configuring and adjusting search space parameter according to an exemplary embodiment.

In an embodiment, as shown in FIG. 6H, the third sending module 612 includes an eighth obtaining sub-module 6126, a second writing sub-module 6127, and a third sending sub-module 6128.

The eighth obtaining sub-module 6126 is configured to obtain the parameter identifier of the search space configuration parameter corresponding to the working state.

The second writing sub-module 6127 is configured to write the parameter identifier into a target field of a preset media access control (MAC) layer message.

The third sending sub-module 6128 is configured to send the preset MAC layer message to the terminal.

Figure 6I:
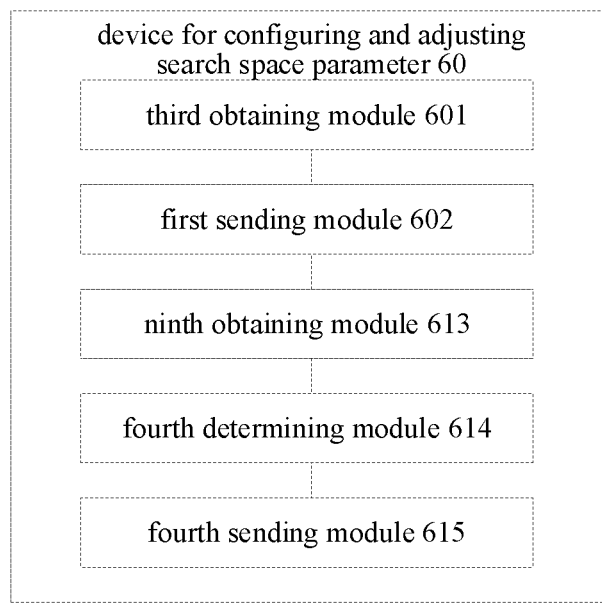
FIG. 6I is a schematic structural diagram showing a device for configuring and adjusting search space parameter according to an exemplary embodiment.

In an embodiment, as shown in FIG. 6I, the device 60 further includes a ninth obtaining module 613, a fourth determining module 614, and a fourth sending module 615.

The ninth obtaining module 613 is configured to obtain a current working state of the terminal, wherein the working state includes at least one of a service type, a service load, channel quality, a transmission/scheduling mode, and a PDCCH detection condition of the terminal at present.

The fourth determining module 614 is configured to determine whether to close the search space according to the current working state of the terminal.

The fourth sending module 615 is configured to send a closing instruction to the terminal if it is determined to close the search space, so that the terminal stops monitoring the search space according to the closing instruction.

The embodiments of the present disclosure provide the device for configuring and adjusting search space parameter, and the device may configure the multiple sets of search space configuration parameter for the terminal during initialization, so that when determining that the current state satisfies the preset condition, the terminal may obtain the search space configuration parameter needed for switching according to the current state, and perform the switching, avoiding time delay caused by adjustment of the search space configuration parameter through a high layer signaling sent by the base station, thereby realizing a solution in which the terminal adjusts the search space configuration parameter at an optimal occasion, and improving efficiency of the terminal to adjust the search space configuration parameter, and reducing power consumption of the terminal.

In an exemplary embodiment, there is provided a device for configuring and adjusting search space parameter, including:
- a first processor; and
- a first memory for storing executable instructions of the first processor;
- the first processor is configured to:
- determine whether a current state satisfies a preset condition;
- obtain a search space configuration parameter corresponding to the current state from pre-stored multiple sets of search space configuration parameter if the current state satisfies the preset condition, wherein each set of search space configuration parameter includes at least one of a search period, a number of time units for continuous search in each search period, a monitoring occasion in the time unit, a control channel element (CCE) aggregation degree in each monitoring occasion, a potential transmission position of a physical downlink control channel (PDCCH) under each CCE aggregation degree, and a downlink control information format;
- switch a search space configuration parameter for currently monitoring search space to the search space configuration parameter corresponding to the current state; and
- use the search space configuration parameter corresponding to the current state to continue monitoring the search space to obtain downlink control information (DCI) sent by a base station through the PDCCH.

In an embodiment, the above-mentioned first processor may be further configured to: determine whether a switching instruction sent by the base station is currently received, wherein the switching instruction includes a parameter identifier of a search space configuration parameter to which the base station instructs the terminal to switch; and confirm that the current state has satisfied the preset condition if it is determined that the switching instruction has been received.

In an embodiment, the above-mentioned first processor may be further configured to: obtain a search space configuration parameter corresponding to the parameter identifier included in the switching instruction from the pre-stored multiple sets of search space configuration parameter as the search space configuration parameter corresponding to the current state.

In an embodiment, the above-mentioned first processor may be further configured to: obtain information of a target field of preset DCI sent by the base station through the PDCCH; determine whether there is a parameter identifier that matches the information of the target field of the preset DCI among a plurality of parameter identifiers corresponding to the multiple sets of search space configuration parameter, respectively; and confirm that the switching instruction sent by the base station is received if there is the parameter identifier that matches the information of the target field of the preset DCI among the plurality of parameter identifiers.

In an embodiment, the above-mentioned first processor may be further configured to: obtain information transmitted by a target control channel in real time; determine whether there is a parameter identifier that matches the information transmitted by the target control channel among a plurality of parameter identifiers corresponding to the multiple sets of search space configuration parameter, respectively; and confirm that the switching instruction sent by the base station is received if there is the parameter identifier that matches the information transmitted by the target control channel among the plurality of parameter identifiers.

In an embodiment, the above-mentioned first processor may be further configured to: obtain information of a target field of a preset media access control (MAC) layer message in real time; determine whether there is a parameter identifier that matches the information of the target field of the preset MAC layer message among a plurality of parameter identifiers corresponding to the multiple sets of search space configuration parameter, respectively; and confirm that the switching instruction sent by the base station is received if there is the parameter identifier that matches the information of the target field of the preset MAC layer message among the plurality of parameter identifiers.

In an embodiment, the above-mentioned first processor may also be configured to: obtain a current working state, wherein the working state includes at least one of a current service type, a service load, channel quality, a transmission/scheduling mode, and a PDCCH detection condition; determine whether the current working state satisfies a first preset state; and confirm that the current state has satisfied the preset condition if the current working state satisfies the first preset state.

In an embodiment, the above-mentioned first processor may be further configured to: obtain the search space configuration parameter corresponding to the current state according to a correspondence between a preset state and a search space configuration parameter, wherein the correspondence between the state and the search space configuration parameter characteries the multiple sets of search space configuration parameter correspond to a plurality of different working states, respectively.

In an embodiment, the above-mentioned first processor may also be configured to: receive a closing instruction sent by the base station, wherein the closing instruction indicates to close the search space; and stop monitoring the search space according to the closing instruction.

In an embodiment, the above-mentioned first processor may be further configured to: receive parameter configuration information sent by the base station, wherein the parameter configuration information includes the multiple sets of search space configuration parameter; and store the multiple sets of search space configuration parameter included in the parameter configuration information.

In an embodiment, the above-mentioned first processor may be further configured to: receive an initial monitoring instruction sent by the base station, wherein the initial monitoring instruction includes a parameter identifier of a search space configuration parameter required by the terminal for initially monitoring the search space instructed by the base station; obtain an initial search space configuration parameter from the multiple sets of search space configuration parameter according to the parameter identifier included in the initial monitoring instruction; and monitor the search space according to the initial search space configuration parameter.

The embodiments of the present disclosure provide the device for configuring and adjusting search space parameter, and when determining that the current state satisfies the preset condition, the device may obtain the search space configuration parameter needed for switching according to the current state, and perform the switching, avoiding time delay caused by adjustment of the search space configuration parameter through a high layer signaling sent by the base station, thereby realizing a solution in which the terminal adjusts the search space configuration parameter at an optimal occasion, and improving efficiency of the terminal to adjust the search space configuration parameter, and reducing power consumption of the terminal.

In an exemplary embodiment, there is provided a device for configuring and adjusting search space parameter, including:
- a second processor; and
- a second memory for storing executable instructions of the second processor;
- wherein, the second processor is configured to:
  - obtain multiple sets of search space configuration parameter corresponding to a plurality of different states of a terminal, respectively, wherein each set of search space configuration parameter includes at least one of a search period, a number of time units for continuous search in each search period, a monitoring occasion in the time unit, a control channel element (CCE) aggregation degree in each monitoring occasion, a potential transmission position of a physical downlink control channel (PDCCH) under each CCE aggregation degree, and a downlink control information format; and
  - send parameter configuration information to the terminal, wherein the parameter configuration information includes the multiple sets of search space configuration parameter, so that the terminal selects a search space configuration parameter corresponding to its current state from the multiple sets of search space configuration parameter for switching.

In an embodiment, the above-mentioned second processor may also be configured to: obtain an initial state of the terminal, wherein the initial state includes at least one of an amount of data to be transmitted, a service type to be processed, or channel quality of the terminal; and obtain the multiple sets of search space configuration parameter according to the initial state of the terminal.

In an embodiment, the above-mentioned second processor may be further configured to: obtain an initial search space configuration parameter required by the terminal for monitoring search space from the multiple sets of search space configuration parameter according to the initial state of the terminal; and send an initial monitoring instruction to the terminal according to the initial search space configuration parameter, wherein the initial monitoring instruction includes a parameter identifier of the initial search space configuration parameter.

In an embodiment, the above-mentioned second processor may also be configured to: obtain a current working state of the terminal, wherein the working state includes at least one of a service type, a service load, channel quality, a transmission/scheduling mode, and a PDCCH detection condition of the terminal at present; determine whether the current working state of the terminal satisfies a first preset state; obtain a search space configuration parameter corresponding to the current working state of the terminal from the multiple sets of search space configuration parameter if the current working state of the terminal satisfies the first preset state; and switch a search space configuration parameter for currently configuring the search space to the search space configuration parameter corresponding to the current working state of the terminal.

In an embodiment, the above-mentioned second processor may also be configured to: obtain a current working state of the terminal, wherein the working state includes at least one of a service type, a service load, channel quality, a transmission/scheduling mode, and a PDCCH detection condition of the terminal at present; determine whether the current working state of the terminal satisfies a second preset state; determine a search space configuration parameter corresponding to the current working state of the terminal from the multiple sets of search space configuration parameter if the current working state of the terminal satisfies the second preset state; and send a switching instruction to the terminal according to the search space configuration parameter corresponding to the working state, wherein the switching instruction includes a parameter identifier of the search space configuration parameter corresponding to the current working state of the terminal.

In an embodiment, the above-mentioned second processor may be further configured to: obtain the parameter identifier of the search space configuration parameter corresponding to the working state; write the parameter identifier into a target field of preset DCI; and send the preset DCI to the terminal through the PDCCH.

In an embodiment, the above-mentioned second processor may be further configured to: obtain the parameter identifier of the search space configuration parameter corresponding to the working state; and send the parameter identifier to the terminal through a target control channel.

In an embodiment, the above-mentioned second processor may be further configured to: obtain the parameter identifier of the search space configuration parameter corresponding to the working state; write the parameter identifier into a target field of a preset media access control (MAC) layer message; and send the preset MAC layer message to the terminal.

In an embodiment, the above-mentioned second processor may also be configured to: obtain a current working state of the terminal, wherein the working state includes at least one of a service type, a service load, channel quality, a transmission/scheduling mode, and a PDCCH detection condition of the terminal at present; determine whether to close the search space according to the current working state of the terminal; and send a closing instruction to the terminal if it is determined to close the search space, so that the terminal stops monitoring the search space according to the closing instruction.

The embodiments of the present disclosure provide the device for configuring and adjusting search space parameter, and the device may configure the multiple sets of search space configuration parameter for the terminal during initialization, so that when determining that the current state satisfies the preset condition, the terminal may obtain the search space configuration parameter needed for switching according to the current state, and perform the switching, avoiding time delay caused by adjustment of the search space configuration parameter through a high layer signaling sent by the base station, thereby realizing a solution in which the terminal adjusts the search space configuration parameter at an optimal occasion, and improving efficiency of the terminal to adjust the search space configuration parameter, and reducing power consumption of the terminal.

Regarding the devices in the foregoing embodiments, specific manners in which respective modules perform operation have been described in detail in the embodiments regarding the methods, and detailed description will not be given here.

Figure 7:
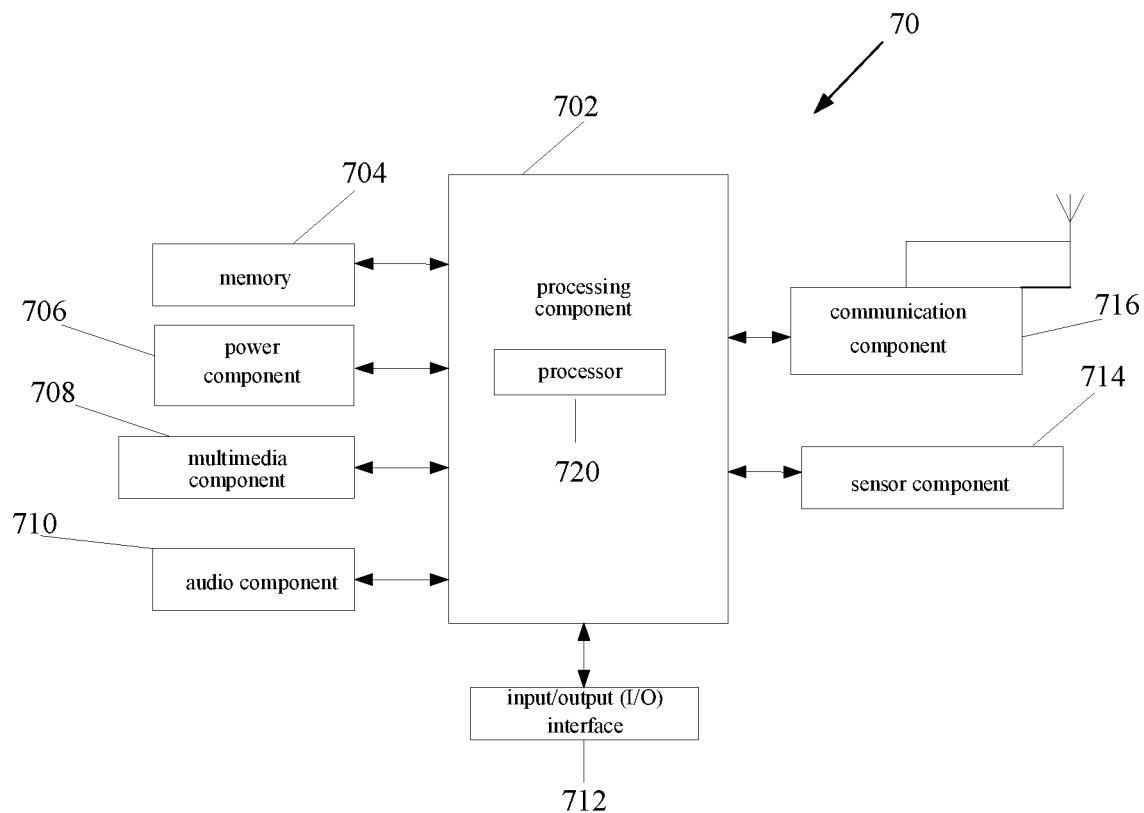
FIG. 7 is a structural block diagram showing a device for configuring and adjusting search space parameter according to an exemplary embodiment.

FIG. 7 is a structural block diagram showing a device 70 for configuring and adjusting search space parameter according to an exemplary embodiment, and the device 70 is suitable for a terminal device. For example, the device 70 may be a mobile phone, a computer, a digital broadcasting terminal, a messaging device, a game console, a tablet device, a medical device, a fitness device, a personal digital assistant, etc.

The device 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls the overall operations of the device 700, such as the operations associated with display, telephone calls, data communications, camera operations, and recording operations. The processing component 702 can include one or more processors 720 to execute instructions to perform all or part of the steps in the above described methods. Moreover, the processing component 702 can include one or more modules to facilitate the interaction between the processing component 702 and other components. For example, the processing component 702 can include a multimedia module to facilitate the interaction between the multimedia component 708 and the processing component 702.

The memory 704 is configured to store various types of data to support the operation of the device 700. Examples of such data include instructions for any application or method operated on the device 700, such as contact data, phone book data, messages, pictures, videos, and the like. The memory 704 may be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 can include a power management system, one or more power sources, and other components associated with the generation, management, and distribution of power in the device 700.

The multimedia component 708 includes a screen providing an output interface between the device 700 and a user. In some embodiments, the screen can include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. When the device 700 is in an operation mode, such as a photographing mode or a video mode, the front camera and/or the rear camera can receive external multimedia data. Each of the front camera and the rear camera may be a fixed optical lens system or have focus and optical zoom capability.

The audio component 710 is configured to output and/or input an audio signal. For example, the audio component 710 includes a microphone (MIC) configured to receive an external audio signal when the device 700 is in an operation mode, such as a call mode, a recording mode, and a voice recognition mode. The received audio signal may be further stored in the memory 704 or sent via the communication component 716. In some embodiments, the audio component 710 also includes a speaker for outputting the audio signal.

The I/O interface 712 provides an interface between the processing component 702 and peripheral interface modules, such as a keyboard, a click wheel, buttons, and the like. These buttons may include, but are not limited to, a home button, a volume button, a starting button, and a locking button.

The sensor component 714 includes one or more sensors for providing state assessments of various aspects of the device 700. For example, the sensor component 714 can detect an open/closed state of the device 700, relative positioning of components, such as the display and the keypad of the device 700. The sensor component 714 can also detect a change in position of one component of the device 700 or the device 700, the presence or absence of user contact with the device 700, an orientation, or an acceleration/deceleration of the device 700, and a change in temperature of the device 700. The sensor component 714 can include a proximity sensor configured to detect the presence of nearby objects without any physical contact. The sensor component 714 can also include a light sensor, such as a CMOS or CCD image sensor, configured to use in imaging applications. In some embodiments, the sensor component 714 can also include an accelerometer sensor, a gyroscope sensor, a magnetic sensor, a pressure sensor, or a temperature sensor.

The communication component 716 is configured to facilitate wired or wireless communication between the device 700 and other devices. The device 700 can access a wireless network based on a communication standard, such as WiFi, 2G or 3G, or a combination thereof. In an exemplary embodiment, the communication component 716 receives broadcast signals or broadcast associated information from an external broadcast management system via a broadcast channel. In an exemplary embodiment, the communication component 716 also includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an exemplary embodiment, the device 700 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components, and configured to perform the above methods.

In an exemplary embodiment, there is also provided a non-transitory computer-readable storage medium including instructions, such as a memory 704 including instructions executable by the processor 720 of the device 700 to perform the above described method. For example, the non-transitory computer readable storage medium may be a ROM, a random access memory (RAM), a CD-ROM, a magnetic tape, a floppy disc, an optical data storage device and the like.

Figure 8:
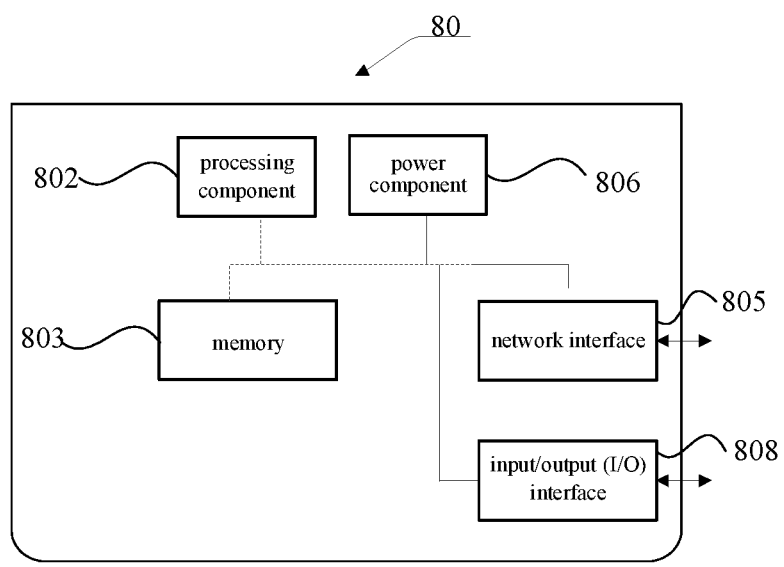
FIG. 8 is a structural block diagram showing a device for configuring and adjusting search space parameter according to an exemplary embodiment.

FIG. 8 is a block diagram showing a device 80 for configuring and adjusting search space parameter according to an exemplary embodiment. For example, the device 80 may be provided as a server, which is used in a base station. The device 80 includes a processing component 802, further including one or more processors, and a memory resource represented by a memory 803, configured to store instructions executable for the processing component 802, for example, an application program. The application program stored in the memory 803 may include one or more than one module of which each corresponds to a set of instructions. In addition, the processing component 802 is configured to execute the instructions to execute the above methods.

The device 800 may further include a power component 806 configured to execute power management of the device 800, a wired or wireless network interface 805 configured to connect the device 800 to a network and an I/O interface 808. The device 800 may be operated based on an operating system stored in the memory 803, for example, Windows Server™, Mac OS X™, Unix™, Linux™, FreeBSD™, or the like.

There is provided a non-transitory computer-readable storage medium. Instructions in the storage medium, when executed by the processor of the device 70, cause the device 70 to be capable of performing the above method for configuring and adjusting search space parameter on the terminal side, and the method includes:

determine whether a current state satisfies a preset condition;
obtain a search space configuration parameter corresponding to the current state from pre-stored multiple sets of search space configuration parameter if the current state satisfies the preset condition, wherein each set of search space configuration parameter includes at least one of a search period, a number of time units for continuous search in each search period, a monitoring occasion in the time unit, a control channel element (CCE) aggregation degree in each monitoring occasion, a potential transmission position of a physical downlink control channel (PDCCH) under each CCE aggregation degree, and a downlink control information format;
switch a search space configuration parameter for currently monitoring search space to the search space configuration parameter corresponding to the current state; and
use the search space configuration parameter corresponding to the current state to continue monitoring the search space to obtain downlink control information (DCI) sent by a base station through the PDCCH.

In an embodiment, the determining whether the current state satisfies the preset condition includes: determining whether a switching instruction sent by the base station is currently received, wherein the switching instruction includes a parameter identifier of a search space configuration parameter to which the base station instructs the terminal to switch; and confirming that the current state has satisfied the preset condition if it is determined that the switching instruction has been received.

In an embodiment, the obtaining the search space configuration parameter corresponding to the current state from the pre-stored multiple sets of search space configuration parameter includes: obtaining a search space configuration parameter corresponding to the parameter identifier included in the switching instruction from the pre-stored multiple sets of search space configuration parameter as the search space configuration parameter corresponding to the current state.

In an embodiment, the determining whether the switching instruction sent by the base station is currently received includes: obtaining information of a target field of preset DCI sent by the base station through the PDCCH; determining whether there is a parameter identifier that matches the information of the target field of the preset DCI among a plurality of parameter identifiers corresponding to the multiple sets of search space configuration parameter, respectively; and confirming that the switching instruction sent by the base station is received if there is the parameter identifier that matches the information of the target field of the preset DCI among the plurality of parameter identifiers.

In an embodiment, the determining whether the switching instruction sent by the base station is currently received includes: obtaining information transmitted by a target control channel in real time; determining whether there is a parameter identifier that matches the information transmitted by the target control channel among a plurality of parameter identifiers corresponding to the multiple sets of search space configuration parameter, respectively; and confirming that the switching instruction sent by the base station is received if there is the parameter identifier that matches the information transmitted by the target control channel among the plurality of parameter identifiers.

In an embodiment, the determining whether the switching instruction sent by the base station is currently received includes: obtaining information of a target field of a preset media access control (MAC) layer message in real time; determining whether there is a parameter identifier that matches the information of the target field of the preset MAC layer message among a plurality of parameter identifiers corresponding to the multiple sets of search space configuration parameter, respectively; and confirming that the switching instruction sent by the base station is received if there is the parameter identifier that matches the information of the target field of the preset MAC layer message among the plurality of parameter identifiers.

In an embodiment, the determining whether the current state satisfies the preset condition includes: obtaining a current working state, wherein the working state includes at least one of a current service type, a service load, channel quality, a transmission/scheduling mode, and a PDCCH detection condition; determining whether the current working state satisfies a first preset state; and confirming that the current state has satisfied the preset condition if the current working state satisfies the first preset state.

In an embodiment, the obtaining the search space configuration parameter corresponding to the current state from the pre-stored multiple sets of search space configuration parameter includes: obtaining the search space configuration parameter corresponding to the current state according to a correspondence between a preset state and a search space configuration parameter, wherein the correspondence between the state and the search space configuration parameter characterizes the multiple sets of search space configuration parameter correspond to a plurality of different working states, respectively.

In an embodiment, the method further includes: receiving a closing instruction sent by the base station, wherein the closing instruction indicates to close the search space; and stopping monitoring the search space according to the closing instruction.

In an embodiment, the method further includes: receiving parameter configuration information sent by the base station, wherein the parameter configuration information includes the multiple sets of search space configuration parameter; and storing the multiple sets of search space configuration parameter included in the parameter configuration information.

In an embodiment, the method further includes: receiving an initial monitoring instruction sent by the base station, wherein the initial monitoring instruction includes a parameter identifier of a search space configuration parameter required by the terminal for initially monitoring the search space instructed by the base station; obtaining an initial search space configuration parameter from the multiple sets of search space configuration parameter according to the parameter identifier included in the initial monitoring instruction; and monitoring the search space according to the initial search space configuration parameter.

There is provided a non-transitory computer-readable storage medium. Instructions in the storage medium, when executed by the processor of the device 80, cause the device 80 to be capable of performing the above method for configuring and adjusting search space parameter on the base station side, and the method includes:

obtaining multiple sets of search space configuration parameter corresponding to a plurality of different states of a terminal, respectively, wherein each set of search space configuration parameter includes at least one of a search period, a number of time units for continuous search in each search period, a monitoring occasion in the time unit, a control channel element (CCE) aggregation degree in each monitoring occasion, a potential transmission position of a physical downlink control channel (PDCCH) under each CCE aggregation degree, and a downlink control information format; and sending parameter configuration information to the terminal, wherein the parameter configuration information includes the multiple sets of search space configuration parameter, so that the terminal selects a search space configuration parameter corresponding to its current state from the multiple sets of search space configuration parameter for switching.

In an embodiment, an initial state of the terminal is obtained, and the initial state includes at least one of an amount of data to be transmitted, a service type to be processed, or channel quality of the terminal; and the multiple sets of search space configuration parameter are obtained according to the initial state of the terminal.

In an embodiment, the method further includes: obtaining an initial search space configuration parameter required by the terminal for monitoring search space from the multiple sets of search space configuration parameter according to the initial state of the terminal; and sending an initial monitoring instruction to the terminal according to the initial search space configuration parameter, wherein the initial monitoring instruction includes a parameter identifier of the initial search space configuration parameter.

In an embodiment, the method further includes: obtaining a current working state of the terminal, wherein the working state includes at least one of a service type, a service load, channel quality, a transmission/scheduling mode, and a PDCCH detection condition of the terminal at present; determining whether the current working state of the terminal satisfies a first preset state; obtaining a search space configuration parameter corresponding to the current working state of the terminal from the multiple sets of search space configuration parameter if the current working state of the terminal satisfies the first preset state; and switching a search space configuration parameter for currently configuring the search space to the search space configuration parameter corresponding to the current working state of the terminal.

In an embodiment, the method further includes: obtaining a current working state of the terminal, wherein the working state includes at least one of a service type, a service load, channel quality, a transmission/scheduling mode, and a PDCCH detection condition of the terminal at present; determining whether the current working state of the terminal satisfies a second preset state; determining a search space configuration parameter corresponding to the current working state of the terminal from the multiple sets of search space configuration parameter if the current working state of the terminal satisfies the second preset state; and sending a switching instruction to the terminal according to the search space configuration parameter corresponding to the working state, wherein the switching instruction includes a parameter identifier of the search space configuration parameter corresponding to the current working state of the terminal.

In an embodiment, the sending the switching instruction to the terminal according to the search space configuration parameter corresponding to the working state includes: obtaining the parameter identifier of the search space configuration parameter corresponding to the working state; writing the parameter identifier into a target field of preset DCI; and sending the preset DCI to the terminal through the PDCCH.

In an embodiment, the sending the switching instruction to the terminal according to the search space configuration parameter corresponding to the working state includes: obtaining the parameter identifier of the search space configuration parameter corresponding to the working state; and sending the parameter identifier to the terminal through a target control channel.

In an embodiment, the sending the switching instruction to the terminal according to the search space configuration parameter corresponding to the working state includes: obtaining the parameter identifier of the search space configuration parameter corresponding to the working state; writing the parameter identifier into a target field of a preset media access control (MAC) layer message; and sending the preset MAC layer message to the terminal.

In an embodiment, the method further includes: obtaining a current working state of the terminal, wherein the working state includes at least one of a service type, a service load, channel quality, a transmission/scheduling mode, and a PDCCH detection condition of the terminal at present; determining whether to close the search space according to the current working state of the terminal; and sending a closing instruction to the terminal if it is determined to close the search space, so that the terminal stops monitoring the search space according to the closing instruction.

Other embodiments of the present disclosure will be apparent to those skilled in the art from consideration of the specification and practice of the present disclosure disclosed herein. The present disclosure is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structures that have been described above and shown in the drawings, and various modifications and changes may be made without departing from the scope thereof. The scope of the present disclosure is limited only by the appended claims.

What is claimed is:

1. A method for configuring and adjusting a search space parameter, comprising:
    determining, by a terminal, whether a current state satisfies a preset condition;
    obtaining, by the terminal, a search space configuration parameter corresponding to the current state from pre-stored multiple sets of search space configuration parameters in response to determining that the current state satisfies the preset condition, wherein each set of search space configuration parameters comprises at least one of following parameters: a search period, a number of time units for continuous search in each search period, a monitoring occasion in the time units, a control channel element (CCE) aggregation degree in each monitoring occasion, a potential transmission position of a physical downlink control channel (PDCCH) under each CCE aggregation degree, and a downlink control information format;
    switching a search space configuration parameter for currently monitoring search space to the search space configuration parameter corresponding to the current state; and
    using the search space configuration parameter corresponding to the current state to continue monitoring the search space to obtain downlink control information (DCI) sent by a base station through the PDCCH.

2. The method according to claim 1, wherein determining whether the current state satisfies the preset condition comprises:
    determining whether a switching instruction sent by the base station is currently received, wherein the switching instruction comprises a parameter identifier of a search space configuration parameter to which the base station instructs the terminal to switch; and
    confirming that the current state has satisfied the preset condition in response to determining that the switching instruction has been received.

3. The method according to claim 2, wherein obtaining the search space configuration parameter corresponding to the current state from the pre-stored multiple sets of search space configuration parameters comprises:
    obtaining a search space configuration parameter corresponding to the parameter identifier comprised in the switching instruction from the pre-stored multiple sets of search space configuration parameters as the search space configuration parameter corresponding to the current state.

4. The method according to claim 2, wherein determining whether the switching instruction sent by the base station is currently received comprises:
    obtaining information of a target field of preset DCI sent by the base station through the PDCCH;
    determining whether there is a parameter identifier that matches the information of the target field of the preset DCI among a plurality of parameter identifiers corresponding to the multiple sets of search space configuration parameters, respectively; and
    confirming that the switching instruction sent by the base station is received in response to determining there is the parameter identifier that matches the information of the target field of the preset DCI among the plurality of parameter identifiers.

5. The method according to claim 2, wherein determining whether the switching instruction sent by the base station is currently received comprises:
    obtaining information transmitted by a target control channel in real time;
    determining whether there is a parameter identifier that matches the information transmitted by the target control channel among a plurality of parameter identifiers corresponding to the multiple sets of search space configuration parameters, respectively; and
    confirming that the switching instruction sent by the base station is received in response to determining that there is the parameter identifier that matches the information transmitted by the target control channel among the plurality of parameter identifiers.

6. The method according to claim 2, wherein determining whether the switching instruction sent by the base station is currently received comprises:
    obtaining information of a target field of a preset media access control (MAC) layer message in real time;
    determining whether there is a parameter identifier that matches the information of the target field of the preset MAC layer message among a plurality of parameter identifiers corresponding to the multiple sets of search space configuration parameters, respectively; and
    confirming that the switching instruction sent by the base station is received in response to determining that there is the parameter identifier that matches the information of the target field of the preset MAC layer message among the plurality of parameter identifiers.

7. The method according to claim 1, wherein determining whether the current state satisfies the preset condition comprises:
    obtaining a current working state, wherein the working state comprises at least one of a current service type, a service load, channel quality, a transmission or scheduling mode, and a PDCCH detection condition;
    determining whether the current working state satisfies a first preset state; and
    confirming that the current state has satisfied the preset condition in response to determining that the current working state satisfies the first preset state.

8. The method according to claim 7, wherein obtaining the search space configuration parameter corresponding to the current state from the pre-stored multiple sets of search space configuration parameters comprises:
    obtaining the search space configuration parameter corresponding to the current state according to a correspondence between a preset state and a search space configuration parameter, wherein the correspondence between the state and the search space configuration parameter characterizes the multiple sets of search space configuration parameters correspond to a plurality of different working states, respectively.

9. The method according to claim 1, further comprising:
    receiving parameter configuration information sent by the base station, wherein the parameter configuration information comprises the multiple sets of search space configuration parameters; and
    storing the multiple sets of search space configuration parameters comprised in the parameter configuration information.

10. The method according to claim 9, further comprising:
receiving an initial monitoring instruction sent by the base station, wherein the initial monitoring instruction comprises a parameter identifier of a search space configuration parameter required by the terminal for initially monitoring the search space instructed by the base station;
obtaining an initial search space configuration parameter from the multiple sets of search space configuration parameters according to the parameter identifier comprised in the initial monitoring instruction; and
monitoring the search space according to the initial search space configuration parameter.

11. A method for configuring and adjusting a search space parameter, comprising:
obtaining, by a base station, multiple sets of search space configuration parameters corresponding to a plurality of different states of a terminal, respectively, wherein each set of search space configuration parameters comprises at least one of following parameters: a search period, a number of time units for continuous search in each search period, a monitoring occasion in the time units, a control channel element (CCE) aggregation degree in each monitoring occasion, a potential transmission position of a physical downlink control channel (PDCCH) under each CCE aggregation degree, and a downlink control information format; and
sending, by the base station, parameter configuration information to the terminal, wherein the parameter configuration information comprises the multiple sets of search space configuration parameters, so that the terminal selects a search space configuration parameter corresponding to a current state of the terminal from the multiple sets of search space configuration parameters for switching.

12. The method according to claim 11, wherein obtaining the multiple sets of search space configuration parameters comprises:
obtaining an initial state of the terminal, wherein the initial state comprises at least one of an amount of data to be transmitted, a service type to be processed, or channel quality of the terminal; and
obtaining the multiple sets of search space configuration parameters according to the initial state of the terminal.

13. The method according to claim 12, further comprising:
obtaining an initial search space configuration parameter required by the terminal for monitoring search space from the multiple sets of search space configuration parameters according to the initial state of the terminal; and
sending an initial monitoring instruction to the terminal according to the initial search space configuration parameter, wherein the initial monitoring instruction comprises a parameter identifier of the initial search space configuration parameter.

14. The method according to claim 11, further comprising:
obtaining a current working state of the terminal, wherein the working state comprises at least one of a service type, a service load, channel quality, a transmission or scheduling mode, and a PDCCH detection condition of the terminal at present;
determining whether the current working state of the terminal satisfies a first preset state;
obtaining a search space configuration parameter corresponding to the current working state of the terminal from the multiple sets of search space configuration parameters in response to determining that the current working state of the terminal satisfies the first preset state; and
switching a search space configuration parameter for currently configuring the search space to the search space configuration parameter corresponding to the current working state of the terminal.

15. The method according to claim 11, further comprising:
obtaining a current working state of the terminal, wherein the working state comprises at least one of a service type, a service load, channel quality, a transmission/scheduling mode, and a PDCCH detection condition of the terminal at present;
determining whether the current working state of the terminal satisfies a second preset state;
determining a search space configuration parameter corresponding to the current working state of the terminal from the multiple sets of search space configuration parameters in response to determining that the current working state of the terminal satisfies the second preset state; and
sending a switching instruction to the terminal according to the search space configuration parameter corresponding to the working state, wherein the switching instruction comprises a parameter identifier of the search space configuration parameter corresponding to the current working state of the terminal.

16. The method according to claim 15, wherein sending the switching instruction to the terminal according to the search space configuration parameter corresponding to the working state comprises:
obtaining the parameter identifier of the search space configuration parameter corresponding to the working state;
writing the parameter identifier into a target field of preset downlink control information (DCI); and
sending the preset DCI to the terminal through the PDCCH.

17. The method according to claim 15, wherein sending the switching instruction to the terminal according to the search space configuration parameter corresponding to the working state comprises:
obtaining the parameter identifier of the search space configuration parameter corresponding to the working state; and
sending the parameter identifier to the terminal through a target control channel.

18. The method according to claim 15, wherein sending the switching instruction to the terminal according to the search space configuration parameter corresponding to the working state comprises:
obtaining the parameter identifier of the search space configuration parameter corresponding to the working state;
writing the parameter identifier into a target field of a preset media access control (MAC) layer message; and
sending the preset MAC layer message to the terminal.

19. The method according to claim 11, wherein the method further comprises:
obtaining a current working state of the terminal, wherein the working state comprises at least one of a service type, a service load, channel quality, a transmission/scheduling mode, and a PDCCH detection condition of the terminal at present;

determining whether to close the search space according to the current working state of the terminal; and sending a closing instruction to the terminal if it is determined to close the search space, so that the terminal stops monitoring the search space according to the closing instruction.

20. A device for configuring and adjusting a search space parameter, comprising:

a processor; and a memory for storing executable instructions of the processor;

wherein the processor is configured to:

determine whether a current state satisfies a preset condition;

obtain a search space configuration parameter corresponding to the current state from pre-stored multiple sets of search space configuration parameters in response to determining that the current state satisfies the preset condition, wherein each set of search space configuration parameter comprises at least one of following parameters: a search period, a number of time units for continuous search in each search period, a monitoring occasion in the time units, a control channel element (CCE) aggregation degree in each monitoring occasion, a potential transmission position of a physical downlink control channel (PDCCH) under each CCE aggregation degree, and a downlink control information format;

switch a search space configuration parameter for currently monitoring search space to the search space configuration parameter corresponding to the current state; and use the search space configuration parameter corresponding to the current state to continue monitoring the search space to obtain downlink control information (DCI) sent by a base station through the PDCCH.

* * * * *